US008672628B2

(12) United States Patent
Sato et al.

(10) Patent No.: US 8,672,628 B2
(45) Date of Patent: Mar. 18, 2014

(54) WIND TURBINE GENERATOR

(75) Inventors: Shinsuke Sato, Tokyo (JP); Tatsuo Ishiguro, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/549,173

(22) Filed: Jul. 13, 2012

(65) Prior Publication Data

US 2012/0299307 A1 Nov. 29, 2012

Related U.S. Application Data

(60) Continuation of application No. PCT/JP2011/065040, filed on Jun. 30, 2011, and a division of application No. 13/242,771, filed on Sep. 23, 2011.

(30) Foreign Application Priority Data

Jun. 30, 2010 (JP) ................. 2010-150473

(51) Int. Cl.
*F03D 11/04* (2006.01)
(52) U.S. Cl.
USPC ......... 416/42; 416/95; 416/244 R; 416/244 A
(58) Field of Classification Search
USPC .............. 415/13, 36, 38, 47, 49, 2.1, 4.1–4.5, 415/905, 907–909, 175–178; 416/31, 42, 416/95, 244 R, 244 A, DIG. 4, DIG. 6, DIG. 8, 416/170 R, 174; 290/44, 55, 1 B
See application file for complete search history.

(56) References Cited

U.S. PATENT DOCUMENTS 6,270,308 B1 8/2001 Groppel
6,774,504 B1 8/2004 Lagerwey
(Continued)

FOREIGN PATENT DOCUMENTS

| JP | 2000-161197 A | 6/2000 |
|---|---|---|
| JP | 2001-167613 A | 6/2001 |
| JP | 2009-531579 A | 9/2009 |
| WO | WO 2010/013362 A1 | 2/2010 |

OTHER PUBLICATIONS

WIPO, International Search Report for PCT/JP2011/065040, Sep. 20, 2011.

(Continued)

*Primary Examiner* — Christopher Verdier
(74) *Attorney, Agent, or Firm* — Manabu Kanesaka; Kenneth M. Berner; Benjamin J. Hauptman

(57) ABSTRACT

With a simple and low-cost structure, it is possible to introduce a sufficient amount of external wind while suppressing power consumption, and thereby, inside a nacelle and a tower are satisfactorily cooled. A wind turbine generator, in which a rotor head generates power by driving a generator installed inside a nacelle and in which the nacelle is installed at a top end of a tower, wherein an introducing vent that takes the external wind into an internal space in the wind turbine generator is provided at a portion of an outer circumference surface of the tower or the nacelle that receives positive pressure due to the external wind; and an exhaust vent that externally exhausts cooling air in the internal space is provided at a portion of an outer circumference surface of the tower or the nacelle that receives the negative pressure due to the external wind.

5 Claims, 20 Drawing Sheets

(56) References Cited

U.S. PATENT DOCUMENTS

| | | |
|---|---|---|
| 7,168,251 B1 | 1/2007 | Janssen |
| 7,843,080 B2 | 11/2010 | Jansen |
| 2004/0213671 A1 | 10/2004 | Flamang |
| 2009/0045628 A1 | 2/2009 | Erdman et al. |
| 2010/0127502 A1 | 5/2010 | Uchino et al. |
| 2011/0241353 A1 | 10/2011 | Numajiri |
| 2012/0032448 A1* | 2/2012 | Sato et al. ............ 290/1 B |

OTHER PUBLICATIONS

USPTO, Office Action for U.S. Appl. No. 13/242,771, Jun. 20, 2012.
Japan Patent Office "Decision to Grant a Patent for JP 2010-150473", Dec. 3, 2013.

* cited by examiner

PRESSURE DISTRIBUTION AT CYLINDER OUTER CIRCUMFERENCE

WIND TURBINE GENERATOR

CROSS REFERENCE TO RELATED APPLICATIONS

This application is a divisional application of U.S. patent application Ser. No. 13/242,771 filed on Sep. 23, 2011, which is a continuation application of PCT/JP2011/065040 filed on Jun. 30, 2011 and claims the benefit of Japanese Application No. 2010-150473 filed in Japan on Jun. 30, 2010, the contents of which is hereby incorporated by reference.

BACKGROUND OF THE INVENTION

1. Field of the Invention

The present invention relates to a wind turbine generator in which heat generated in equipment during operation is cooled by introducing external air.

2. Description of Related Art

A standard wind turbine generator is an apparatus in which a rotor head provided with turbine blades rotates by receiving wind force, and a generator is driven by increasing the speed of this rotation by using a gear box, etc., thus generating power. The rotor head is mounted at an end portion of a nacelle, which is installed at the top of a tower erected on the ground, etc. and which is capable of yawing, and is supported so as to be rotatable about a substantially horizontal, laterally oriented rotation axis.

In general, a monopole-type steel tower employing a cylindrical tower shell is often employed as the above-described tower, and the structure thereof is such that a base plate provided at the bottom end of the tower shell is secured to a steel-reinforced concrete foundation with anchoring bolts. Because heat-generating electrical equipment, such as a converter and a transformer, is installed inside such a wind turbine generator in addition to the generator, such electrical equipment needs to be appropriately cooled to continue stable operation.

In a conventional simple cooling structure, a ventilating fan is installed inside the tower or the nacelle, and the heat-generating electrical equipment is cooled by force-feeding cool external air into the interior. For example, as disclosed in U.S. Pat. No. 7,168,251, there is a known cooling structure in which cooling liquid, such as water, oil, etc., is circulated inside the heat-generating electrical equipment with a circulation pump; heat exchange is performed with the cooling liquid supplied for cooling at a heat exchanger; and the exhaust heat therefrom is externally released.

However, when a ventilating fan is installed or cooling liquid is circulated to serve as a cooling structure for cooling heat-generating electrical equipment, as described above, the configuration thereof inevitably becomes complicated, and, in addition, power generated by the wind turbine generator must be consumed to drive the ventilating fan or the circulation pump, which is not desirable.

In the case of a liquid cooling system, there is a problem in that, in addition to having a complex structure to begin with, by installing a heat exchanger, the nacelle and its surroundings are increased in size and also become heavier; therefore, the strength of the tower inevitably needs to be increased. Additionally, because the heat exchanger is structured so as to be exposed to external air, in the case in which the wind turbine generator is installed at the coast or at sea, the heat exchanger must be sufficiently protected against corrosion; and the building cost of the wind turbine generator is increased due to these factors.

In the case in which introducing vents for taking in the external wind and exhaust vents for exhausting the internal air are provided, the number of these openings and the area of the openings must be minimized, and the strength of the tower must be ensured.

BRIEF SUMMARY OF THE INVENTION

The present invention has been conceived in light of the above-described circumstances, and an object thereof is to provide a wind turbine generator that can introduce a sufficient amount of external wind with a simple and low-cost configuration while suppressing power consumption and that can achieve preferable cooling of heat-generating electrical equipment installed inside the nacelle and the tower.

In order to solve the above-described problems, the present invention employs the following solutions.

Specifically, a wind turbine generator according to an aspect of the present invention is a wind turbine generator in which a rotor head that rotates by receiving external wind with turbine blades generates power by driving a generator installed inside a nacelle and in which the nacelle is installed at a top end of a tower, wherein an introducing vent that takes the external wind into an internal space in the wind turbine generator is provided at a portion of an outer circumference surface of the tower or the nacelle that receives positive pressure due to the external wind; and an exhaust vent that externally exhausts cooling air in the internal space is provided at a portion of an outer circumference surface of the tower or the nacelle that receives the negative pressure due to the external wind.

With such a wind turbine generator, when the external wind blows on the wind turbine generator, because a pressure difference is generated between the introducing vent provided at the outer circumference surface of the tower or the nacelle to receive the positive pressure due to the external wind and the exhaust vent that similarly receives the negative pressure due to the external wind, the interior of the wind turbine generator can be ventilated without any motive force. That is, the external wind taken in from the introducing vent can be made to flow inside the wind turbine generator as cooling air, and it can be exhausted outside from the exhaust vent after satisfactorily cooling the heat-generating electrical equipment installed inside the wind turbine generator.

In this way, the heat-generating electrical equipment internally installed can be cooled by taking the external wind into the interior of the wind turbine generator by utilizing the pressure difference generated between the introducing vent and the exhaust vent, and, because there is no need to provided a ventilating fan, or the like, to take in the external wind, the heat-generating electrical equipment installed inside the nacelle and the tower can be satisfactorily cooled with a simple and low-cost configuration and without power consumption.

In the wind turbine generator according to the above-described aspect, heat-generating equipment may be disposed between the introducing vent and the exhaust vent.

Accordingly, the heat-generating equipment can be satisfactorily cooled.

In the wind turbine generator according to the above-described aspect, in the case where the introducing vent and the exhaust vent are provided in the tower, the introducing vent may be provided in the outer circumference surface in the circumference direction, at a position where the positive pressure due to the external wind becomes the highest; and the exhaust vent may be provided at a position that forms a substantially right angle with the circumference direction from the position of the introducing vent.

With the above-described configuration, the introducing vent is provided at the position in the outer circumference surface of the tower where the positive pressure due to the external wind becomes the highest, and, at the exhaust vent, which is provided at the position that forms a substantially right angle with the circumference direction from the position of the introducing vent, the highest negative pressure acts when the external wind flows along the outer circumference surface of the tower; therefore, the pressure difference between the positive pressure exerted at the introducing vent and the negative pressure exerted at the exhaust vent is maximized.

Accordingly, the external wind is efficiently taken into the interior of the wind turbine generator from the introducing vent; the internal air that has cooled the interior of the wind turbine generator is efficiently exhausted outside from the exhaust vent; and thus, the cooling efficiency is increased.

In the wind turbine generator according to the above-described aspect, there may be a height difference between the position of the introducing vent and the position of the exhaust vent.

Accordingly, a large area of the internal space in the wind turbine generator can be cooled, and a reduction in the tower strength caused by disposing the introducing vent and the exhaust vent close to each other can be avoided.

In the wind turbine generator according to the above-described aspect, in the case where the introducing vent is provided in the tower, the height thereof may be set near the highest position in a range from a ground surface where the tower is erected to a bottom end of a rotation trace of distal ends of the turbine blades.

The ground speed of the external wind is generally low near the ground surface on which the tower is erected, and a turbulent airflow is generated behind the turbine blades due to the rotation of the turbine blades; therefore, as described above, by setting the introducing vent near the highest position in the range from the ground surface to the bottom end of the rotation trace of distal ends of the wind turbine blades, the external wind having high ground speed can be introduced from the introducing vent without being affected by the turbulent airflow, and the interior of the wind turbine generator can be satisfactorily cooled.

In the wind turbine generator according to the above-described aspect, negative-pressure enhancing means for enhancing negative pressure exerted by the external wind may be provided at the exhaust vent.

Accordingly, the negative pressure that acts at the exhaust vent is enhanced; therefore, the air inside the wind turbine generator can be efficiently exhausted from the exhaust vent, and the cooling efficiency inside the wind turbine generator can be increased.

In the wind turbine generator according to the above-described aspect, the negative-pressure enhancing means may be a cover member that covers an opening of the exhaust vent and that is separated from the exhaust vent by a predetermined distance.

With this configuration, the negative-pressure enhancing means can be configured in a very simple manner.

In the wind turbine generator according to the above-described aspect, introducing-vent opening/closing means that opens when the outside air pressure becomes greater than the inside air pressure and that closes when the inside air pressure becomes greater than the outside air pressure may be provided at the introducing vent.

With the above-described configuration, for example, when a plurality of introducing vents are provided along the circumference direction of the tower having a circular cross-sectional shape, the introducing-vent opening/closing means opens at the introducing vent directly facing the external wind because the outside air pressure becomes greater than the inside air pressure thereat, and the introducing-vent opening/closing means at other introducing vents close because the outside air pressure becomes lower than the inside air pressure thereat. Accordingly, the external wind is efficiently introduced, and the external wind, once it has once been introduced, is prevented from escaping from other introducing vents. Therefore, the pressure difference between the introducing vents and the exhaust vent can be increased, a sufficient amount of the external wind can be sent into the interior of the wind turbine generator, and the cooling efficiency inside the wind turbine generator can be increased.

In the wind turbine generator according to the above-described aspect, exhausting-vent opening/closing means that closes when the outside air pressure becomes greater than the inside air pressure and that opens when the inside air pressure becomes greater than the outside air pressure may be provided at the exhaust vent.

With the above-described configuration, for example, when a plurality of exhaust vents are provided along the circumference direction of the tower having a circular cross-sectional shape, the exhausting-vent opening/closing means closes at the exhaust vent directly facing the external wind because the outside air pressure becomes greater than the inside air pressure thereat, and the exhausting-vent opening/closing means at other exhaust vents open because the outside air pressure becomes lower than the inside air pressure thereat.

Accordingly, the external wind is efficiently exhausted, a comparatively greater amount of the external wind is taken in from the introducing vent, and the cooling efficiency inside the wind turbine generator can be increased.

In the wind turbine generator according to the above-described aspect, the tower may have a double cylinder structure; the introducing vent may be provided so as to communicate with one of an outer space and an inner space thereof; the exhaust vent may be provided so as to communicate with the other space; and the outer space and the inner space may be communicated at a position away from the introducing vent and the exhaust vent.

With the above-described configuration, foreign matter contained in the external wind, such as moisture, salt, dust, etc., can be made to naturally fall mainly in the outer space to be separated from the airflow due to the fact that the distance from the introducing vent to the exhaust vent is increased, that the direction of the air flow changes between the outer space and the inner space, and that a centrifugal force acts on the airflow that flows in the circumference direction in the outer space which forms a cylindrical space, and a pressure-drop member, such as a filter or the like need not be provided or, even if it is provided, a simple one is sufficient; therefore, a sufficient amount of the external wind can be taken in from the introducing vent, and the cooling efficiency inside the wind turbine generator can be increased.

In the wind turbine generator according to the above-described aspect, foreign-matter removing means for removing foreign matter contained in external air introduced from the introducing vent may be provided downstream of the introducing vent.

By doing so, foreign matter contained in the external wind, such as moisture, salt, dust, etc., can be removed and the integrity of internal equipment can be maintained.

In the wind turbine generator according to the above-described aspect, in a case where the introducing vent and the exhaust vent are provided in the tower, air vents may be provided at three or more locations along the outer circumference surface in the circumference direction thereof; and these air vents may serve as the introducing vent or the exhaust vent depending on wind direction.

When configured in this way, the tower interior can always be satisfactorily cooled regardless of the wind direction of the external wind.

As described above, with the wind turbine generator according to the present invention, by utilizing a pressure difference generated between an introducing vent and an exhaust vent with a simple and low-cost configuration, it is possible to introduce an adequate amount of external wind while suppressing power consumption, and heat-generating electrical equipment installed inside a nacelle and a tower can be satisfactorily cooled.

DETAILED DESCRIPTION OF THE INVENTION

Embodiments of a wind turbine generator according to the present invention will be described below.

Figure 1:
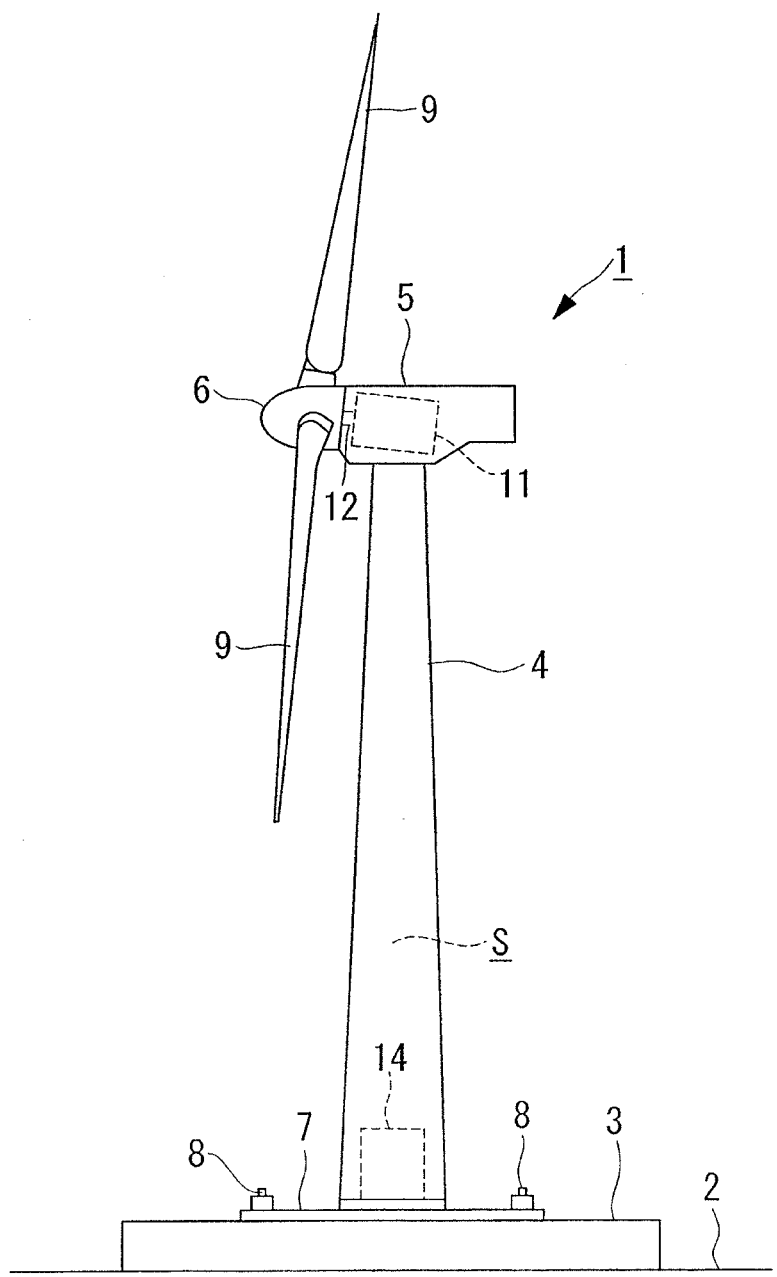
FIG. 1 is a side view showing an example of a wind turbine generator to which the embodiments of the present invention can be applied.

FIG. 1 is a side view showing an example of a wind turbine generator to which cooling structures A to H in individual embodiments, described later, can be applied. This wind turbine generator 1 includes a tower 4 that is erected on a steel-reinforced concrete foundation 3 installed on a ground surface 2, a nacelle 5 installed at the top end of the tower 4, and a rotor head 6 that is provided at a front end of the nacelle 5 by being supported in a rotatable manner about a substantially horizontal, laterally oriented rotation axis.

The tower 4 is a monopole-type made of a steel cylinder, and the cross-sectional shape thereof is substantially circular. At the bottom end of the tower 4, for example, a base plate 7 made of a steel plate is secured to the foundation 3 by being fastened thereto with numerous anchoring bolts 8. A plurality of turbine blades 9 (for example, three) are mounted to the rotor head 6 extending in radial directions, a generator 11 is installed by being accommodated inside the nacelle 5, and a rotating shaft 12 of the rotor head 6 is connected to a main shaft of the generator 11 via a gear box, or the like. Accordingly, the wind force of external wind striking the turbine blades 9 is converted to a rotational force that rotates the rotor head 6 and the rotating shaft 12, and thus, the generator 11 is driven to perform power generation.

The nacelle 5, together with the turbine blades 9, can be turned in the horizontal direction at the top end of the tower 4 and is controlled with a drive device and a control device (not shown) so as to be constantly directed in the upwind direction to enable efficient power generation. In addition, electrical equipment 14, which cannot be exposed to external wind and rain, is installed in an internal space S in the tower 4. Examples of the electrical equipment 14 include heat-generating equipment, such as a converter and a transformer; however, because the internal space S in the tower 4 is like a closed chamber, in embodiments described below, heat from the electrical equipment 14, etc. installed in the internal space S is cooled by cooling structures A to J.

First Embodiment

Figure 2:
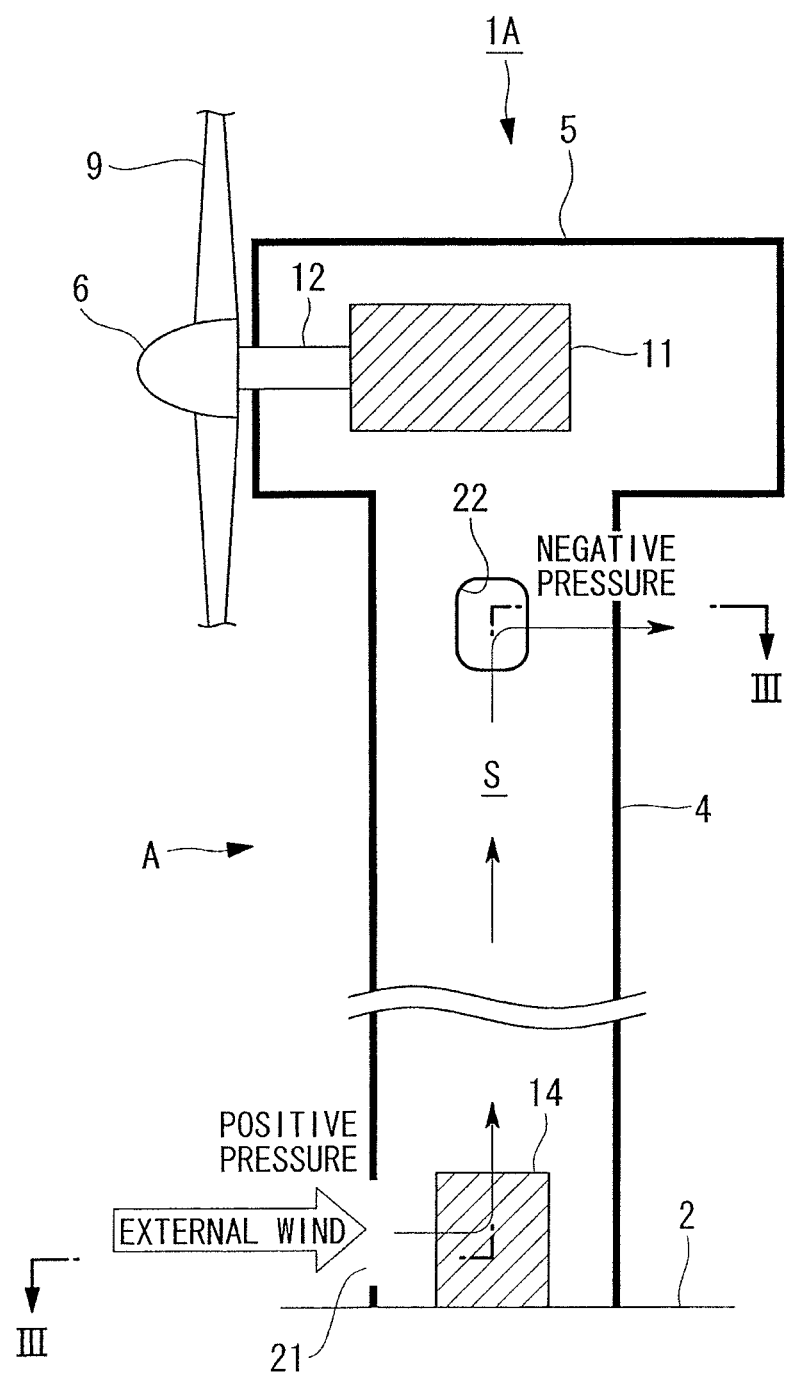
FIG. 2 is a schematic longitudinal cross-section of a wind turbine generator according to a first embodiment of the present invention.
Figure 3:
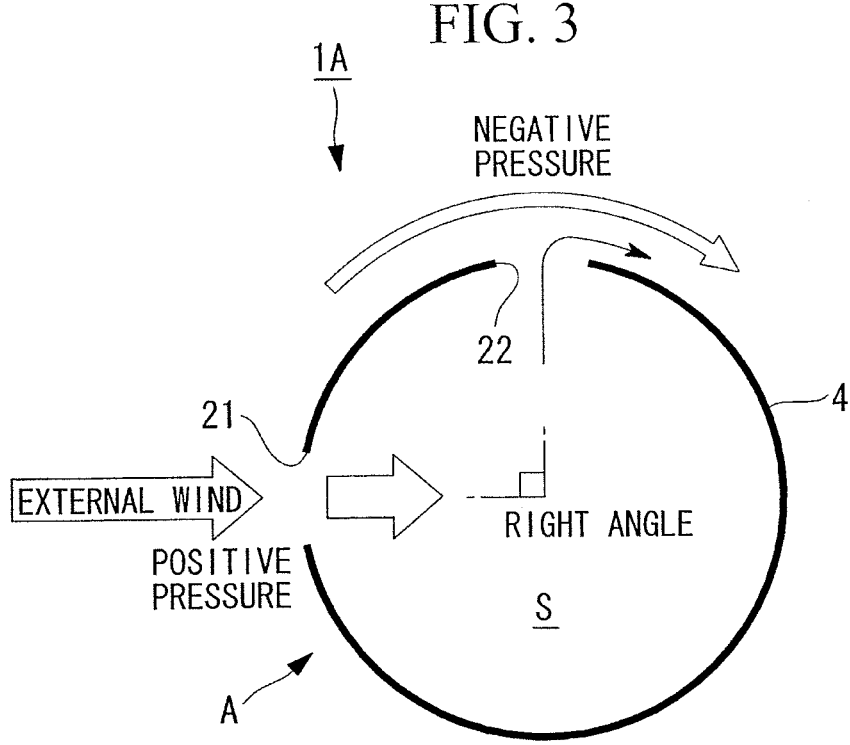
FIG. 3 is a lateral cross-section taken along line III-III in FIG. 2.

FIG. 2 is a schematic longitudinal cross-section of a wind turbine generator 1A according to a first embodiment of the present invention, and FIG. 3 is a lateral cross-section taken along line III-III in FIG. 2. The wind turbine generator 1A is provided with a cooling structure A. In this cooling structure A, an introducing vent 21 and an exhaust vent 22 are provided in the tower 4 having a substantially circular cross-sectional shape as described above. The introducing vent 21 is an opening for taking external wind into the internal space S in the tower 4 as cooling air and is provided at an outer circumference surface of the tower 4 at a portion that receives positive pressure due to the external wind. The exhaust vent 22 is an opening for externally exhausting the cooling air inside the internal space S and is provided at the outer circumference surface of the tower 4 at a portion that receives negative pressure due to the external wind.

More specifically, in consideration of the geographical location where the wind turbine generator 1A is installed, in the circumference direction of the outer circumference surface of the tower 4, the introducing vent 21 is provided at a surface where the wind strikes the most on average throughout the year, that is, the surface subjected to the highest positive pressure due to the external wind, and the exhaust vent 22 is provided at a position that forms a right angle with the circumference direction from the position of introducing vent 21. In FIG. 3, the exhaust vent 22 is provided at one location at a position that is 90° away from the introducing vent 21 on one side; however, if the strength of the tower 4 and various conditions allow, the exhaust vents 22 may be provided at two locations on both sides of the introducing vent 21.

The shapes of the introducing vent 21 and the exhaust vent 22 are desirably shapes that do not compromise the strength of the tower 4. Such shapes include, for example, a circular shape, a longitudinally elongated elliptical shape, an elongated circular shape, etc., in which stress is less likely to become concentrated. In this embodiment, as well as individual embodiments described later, the introducing vent 21 and the exhaust vent 22 may be formed by arranging a plurality of small holes, slits, etc. close to each other instead of forming each of them as a single opening. By doing so, reduction of strength of the tower 4 associated with the formation of the introducing vent 21 and the exhaust vent 22 can be minimized.

There is a height difference between the position of the introducing vent 21 and the position of the exhaust vent 22. For example, the introducing vent 21 is formed near the bottom end of the tower 4, that is, at a position close to the ground surface 2 and the electrical equipment 14, and the exhaust vent 22 is formed near the top end of the tower 4. By doing so, a large area of the internal space S in the tower 4 can be cooled, and a reduction in the strength of the tower 4 caused by arranging the introducing vent 21 and the exhaust vent 22 close to each other can be avoided. The electrical equipment 14 is disposed between the introducing vent 21 and the exhaust vent 22.

The cooling structure A configured as described above operates as follows.

When the external wind blows on the wind turbine generator 1A, a pressure difference is generated between the introducing vent 21 provided at the portion of the outer circumference surface of the tower 4 that receives the positive pressure due to the external wind and the exhaust vent 22 that similarly receives the negative pressure due to the external wind, and the interior of the wind turbine generator 1A is naturally ventilated without a motive force. That is, the external wind is directly introduced into the interior in the tower 4 as cooling air, and the temperature of this cooling air increases in return when cooling the heat-generating electrical equipment 14 installed in the internal space S in the tower 4, thus flowing toward the exhaust vent 22 formed above in accordance with the natural law that hot air forms an upward convective flow.

Figure 4:
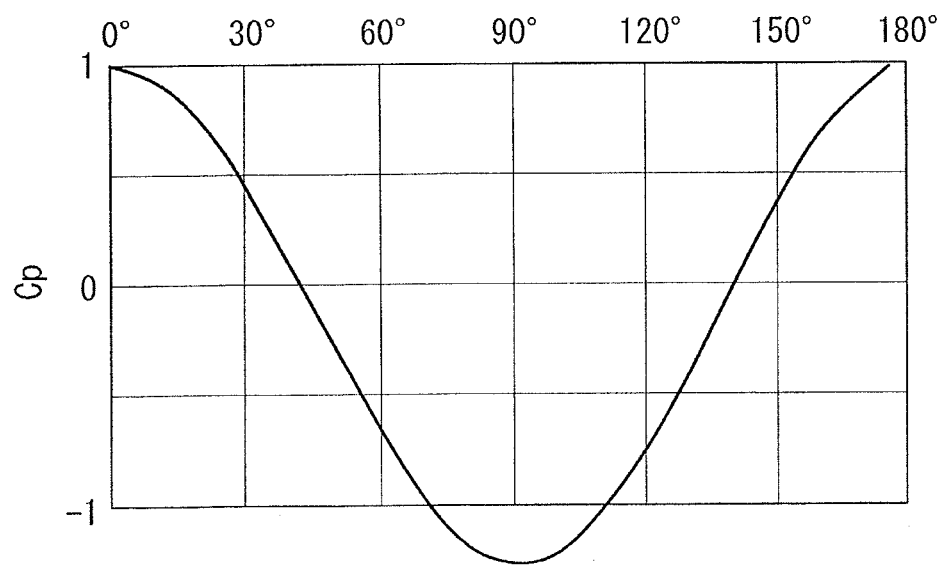
FIG. 4 is a diagram showing a graph of a pressure distribution at an outer circumference surface of a tower.

On the other hand, as described above, the exhaust vent 22 is provided at the position that forms a right angle with the circumference direction from the position of the introducing vent 21, which receives the highest positive pressure due to the external wind; however, this position is a location where the negative pressure generated by the external wind is maximized. As in known data of a pressure distribution at a cylinder outer circumference shown in FIG. 4, when the position of the introducing vent 21 in the circumference direction is defined as 0°, if a maximum value of positive pressure that acts on this position 0° is +1, as the position moves from here in the circumference direction to 30°, 60° and so on, the positive pressure changes to negative pressure, reaching the maximum value of the negative pressure minus 1, or less, at a position in the vicinity of almost 90°. That is, the negative pressure becomes larger than the positive pressure in terms of absolute values.

Therefore, a large negative pressure acts on the exhaust vent 22 provided at this 90° position, and as shown in FIG. 3, the cooling air in the internal space S is strongly sucked outside from the exhaust vent 22 so as to join the flow of the external wind that flows near the exhaust vent 22, thereby achieving efficient exhaustion. Thus, the electrical equipment 14 disposed between the introducing vent 21 and the exhaust vent 22 is effectively cooled by the cooling air.

As described above, with the wind turbine generator 1A provided with the cooling structure A, the external wind can be taken into the internal space S in the wind turbine generator 1A (tower 4) from the introducing vent 21 to cool the heat-generating electrical equipment 14, and then, the heat thereof can be smoothly exhausted from the exhaust vent 22 with a very simple, low-cost configuration. In particular, because the introducing vent 21 is provided at the outer circumference surface at the portion that receives the positive pressure due to the external wind and because the exhaust vent 22 is provided at a position that forms a substantially right angle with the circumference direction from the introducing vent 21, the maximum pressure difference is ensured between the positive pressure acting at the introducing vent 21 and the negative pressure acting at the exhaust vent 22, and the external wind can be efficiently taken in from the introducing vent 21 and exhausted from the exhaust vent 22 without using a motive force, such as a ventilating fan, etc.; therefore, the electrical equipment 14 can be satisfactorily cooled without power consumption.

Second Embodiment

Figure 5:
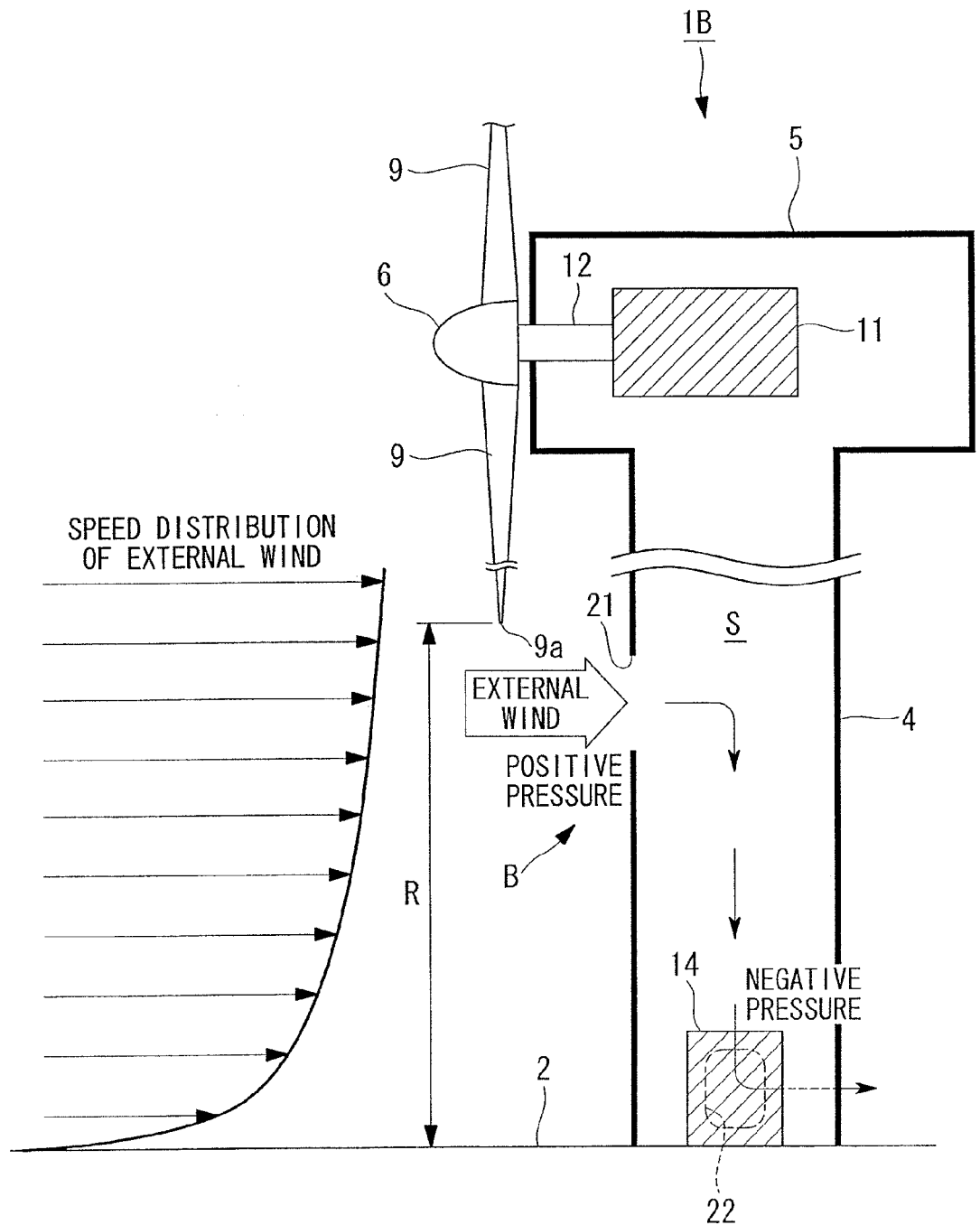
FIG. 5 is a schematic longitudinal cross-section of a wind turbine generator according to a second embodiment of the present invention.

FIG. 5 is a schematic longitudinal cross-section of a wind turbine generator 1B according to a second embodiment of the present invention. The wind turbine generator 1B is provided with a cooling structure B. This cooling structure B differs from the cooling structure A in the above-described first embodiment only in that the installation height of the introducing vent 21 is close to a middle portion of the tower 4 and that the installation height of the exhaust vent 22 is close to the bottom end of the tower 4, and other configurations are the same as those of the cooling structure A. That is, the positional relationship between the introducing vent 21 and the exhaust vent 22 in plan view is as shown in FIG. 3, and operational advantages brought about by doing so are also similar to those of the cooling structure A.

In this cooling structure B, the height of the introducing vent 21 is set near the highest position in a range R from the ground surface 2 to a bottom end of a rotational trace of the distal ends 9a of the turbine blades 9. As in the external wind speed distribution shown in FIG. 5, the ground speed of the external wind is generally low near the ground surface 2 and tends to increase as the distance from the ground surface 2 increases. Because a turbulent airflow is generated behind the turbine blades 9 in association with the rotation of the turbine blades 9, by providing the introducing vent 21 at the above-described height that does not overlap with the wake of the rotational trace of the turbine blades 9, external wind having comparatively high ground speed can be introduced from the introducing vent 21 without being influenced by the turbulent airflow caused by the turbine blades 9, and an excellent cooling of the interior of the wind turbine generator 1B can be achieved.

The height of the exhaust vent 22 may not necessarily be near the bottom end of the tower 4; however, because it is desirable that the heat-generating electrical equipment 14 be disposed between the introducing vent 21 and the exhaust vent 22, the exhaust vent 22 in this case is disposed near the bottom end of the tower 4 so as to match with the installation position of the electrical equipment 14.

Third Embodiment

Figure 6:
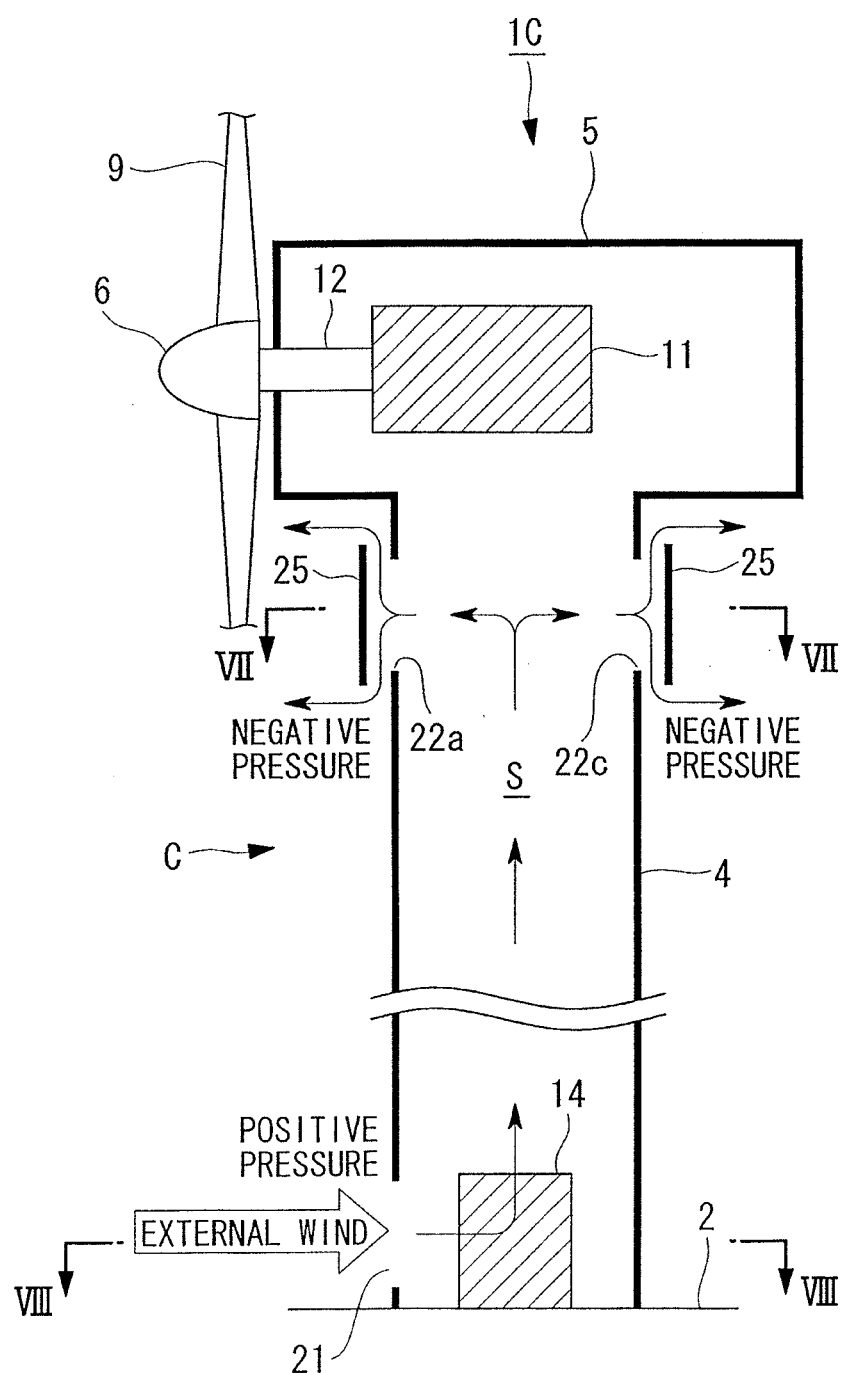
FIG. 6 is a schematic longitudinal cross-section of a wind turbine generator according to a third embodiment of the present invention.
Figure 7:
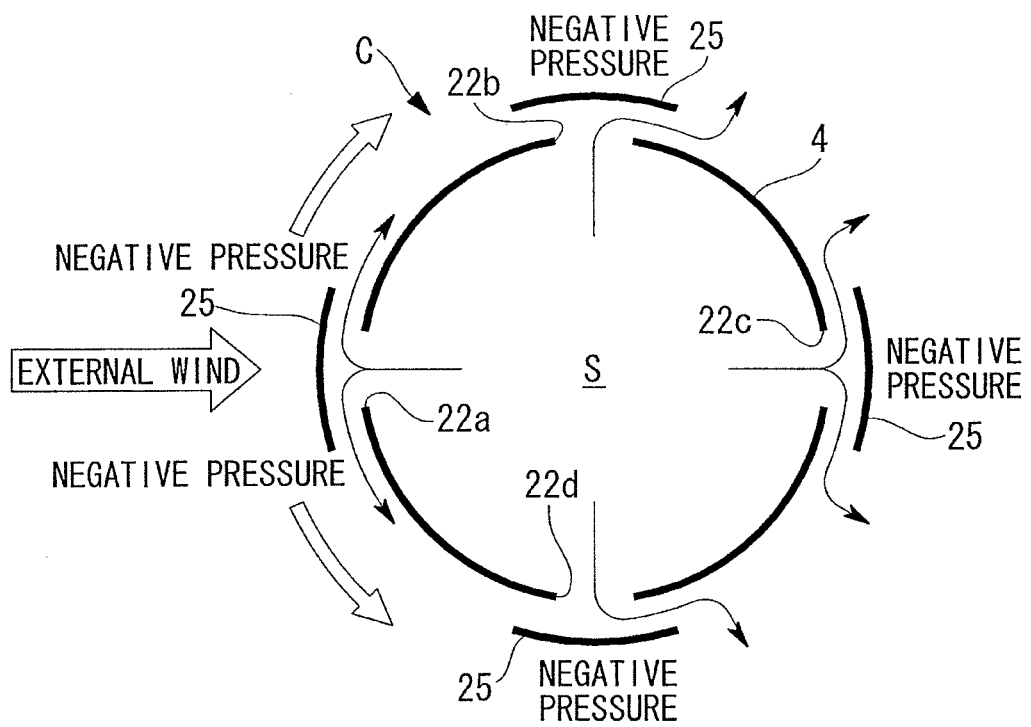
FIG. 7 is a lateral cross-section taken along line VII-VII in FIG. 6.
Figure 8:
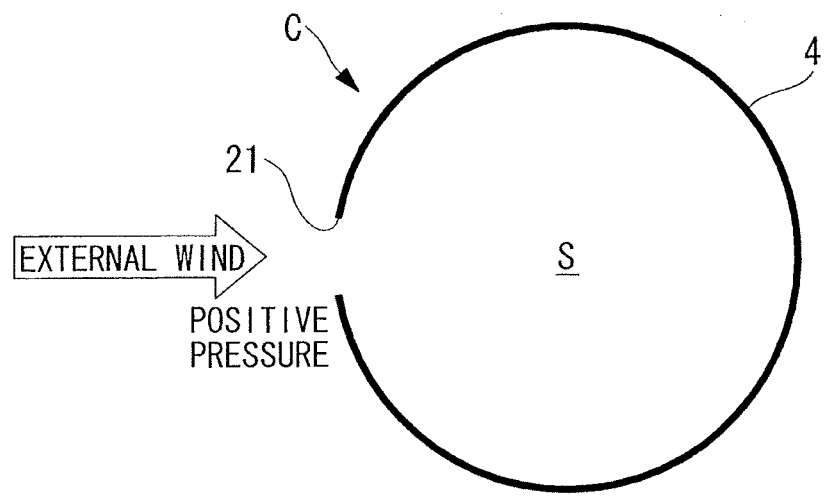
FIG. 8 is a lateral cross-section taken along line VIII-VIII in FIG. 6.

FIG. 6 is a schematic longitudinal cross-section of a wind turbine generator 1C according to a third embodiment of the present invention, FIG. 7 is a lateral cross-section taken along line VII-VII in FIG. 6, and FIG. 8 is a lateral cross-section taken along line VIII-VIII in FIG. 6. The wind turbine generator 1C is provided with a cooling structure C. In this cooling structure C, as in the cooling structure A in the first embodiment, the introducing vent 21 is disposed near the bottom end of the tower 4, and exhaust vents 22a to 22d are disposed near the top end of the tower 4.

As in the cooling structure A, in the circumference direction of the outer circumference surface of the tower 4, the introducing vent 21 is provided only at a single location at a surface where the wind strikes the most on average throughout the year, that is, the surface subjected to the highest positive pressure due to the external wind. On the other hand, the exhaust vents 22a to 22d are provided at four locations at a height near the top end of the tower 4 at, for example, 90° intervals in the circumference direction; however, the number to be provided and the interval thereof may be arbitrarily set, for example, three locations at 120° intervals, etc.

As negative-pressure enhancing means for enhancing the negative pressure exerted by the external wind, each of the exhaust vents 22a to 22d is provided with, for example, a cover member 25. The cover members 25 are plate-like members that cover the openings of the exhaust vents 22a to 22d and that are secured via various stays and brackets (not shown) separated from the exhaust vents 22a to 22d by a predetermined distance. The areas of the cover members 25 are set to be one size larger than the opening area of the exhaust vents 22a to 22d. As shown in FIG. 7, the cover members 25 are curved along the curved shape of the outer circumference surface of the tower 4; however, they may be formed in, for example, flat plate shapes.

The cooling structure C configured as above operates as follows.

When the external wind blows on the wind turbine generator 1C, the external wind directly blows into the introducing vent 21 provided at the position where the positive pressure due to the external wind becomes the highest, is introduced into the interior of the tower 4 as cooling air, and, after cooling the heat-generating machines, such as the electrical equipment 14, etc., moves toward the exhaust vents 22a to 22d provided above. On the other hand, at the exhaust vents 22a to 22d, the negative pressure due to the external wind that acts at the exhaust vents 22a to 22d is enhanced by providing the cover members 25.

In other words, as shown in FIG. 7, at the position of the exhaust vent 22a that directly faces the external wind, because this is a location that receives the highest positive pressure due to the external wind as in FIG. 3, the external wind will directly enter the exhaust vent 22a if the cover member 25 is not provided; however, by providing the cover member 25, the external wind collides with the cover member 25 instead of entering inside the exhaust vent 22a, after which the flow thereof is divided into left and right subsequently flows rearward along an outer circumference curved surface of the tower 4. Accordingly, strong negative pressure is generated between the cover member 25 and the outer circumference surface of the tower 4, that is, in the vicinity of the exhaust vent 22a, due to which the air inside the tower 4 is sucked outside from the exhaust vent 22a.

As in the case of the above-described cooling structure A, the positions where the exhaust vents 22b and 22d are provided are provided at the positions that form right angles (90°) with the circumference direction from the position of the exhaust vent 22a that receives the highest positive pressure due to the external wind; therefore, they are the locations where the negative pressure generated by the flow of the external wind reaches almost its maximum. Accordingly, even if the cover members 25 are not provided, strong negative pressure acts on the exhaust vents 22b and 22d, and a suction effect on the internal air, like that shown in FIG. 3, is realized. Furthermore, by providing the cover members 25 here, the flow of the external wind that flows rearward along the outer circumference curved surface of the tower 4 is rectified and airflow separation near the exhaust vents 22b and 22d is prevented; therefore, the negative pressure that acts on the exhaust vents 22b and 22d is enhanced.

Accordingly, as shown in FIG. 7, the cooling air in the internal space S is sucked outside from the exhaust vents 22b and 22d so as to join the flow of the external wind that flows near the exhaust vents 22b and 22d, thereby achieving efficient exhaustion. By providing the cover member 25, the negative pressure is enhanced even at the position of the exhaust vent 22c; therefore, the internal air is also exhausted from the exhaust vent 22c. Here, although a description has been given of an example in which the exhaust vents 22a to 22d are provided at four locations at equal intervals in the circumference direction, the present invention is not particularly limited only to this embodiment. Even if the exhaust vents 22b and 22d shown in FIG. 7 are provided at positions shifted by 120° in the circumference direction from the position of the exhaust vent 22a, strong negative pressure can be made to act at the exhaust vents 22b and 22d in a similar manner by providing the cover members 25.

By providing the cover members 25 for the exhaust vents 22a to 22d in this way, the negative pressure from the eternal wind that acts at the exhaust vents 22a to 22d can be enhanced, and, moreover, a large quantity of internal air can be expelled also from the exhaust vent 22a that is positioned directly facing the external wind; therefore, the pressure difference between the introducing vent 21 and the exhaust vents 22a to 22d can be increased further, sufficient external wind can be introduced from the introducing vent 21, air in the internal space S can be efficiently exhausted from the exhaust vents 22a to 22d, and the internal cooling performance of the wind turbine generator 1C can be increased.

Furthermore, even if the wind direction of the external wind changes, the exhaust vents 22a to 22d, a plurality of which are provided, can always receive the negative-pressure enhancement of the cover members 25; therefore, the risk of the cooling efficiency of the wind turbine generator 1C decreasing depending on the wind direction is low, and a stable cooling effect can be obtained throughout the year. Because the cover members 25 have a very simple configuration, there is no concern that the construction costs of the wind turbine generator 1C will increase.

Figure 9:
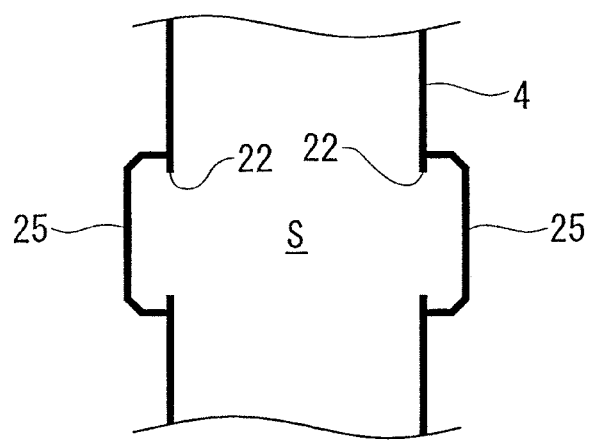
FIG. 9 is a longitudinal cross-section showing an example in which a halo member is utilized as a reinforcing member.

It is conceivable to reduce a loss in strength of the tower 4 caused by providing openings for the exhaust vents 22a to 22d by firmly securing the cover members 25 to the exhaust vents 22a to 22d, thereby utilizing the cover members 25 as reinforcing members. For example, it is conceivable that, for example as shown in FIG. 9, top and bottom ends of the cover members 25 are bent or curved toward the outer circumference surface of the tower 4, that the cover members 25 are formed like a tunnel by bonding the distal ends thereof to the outer circumference surface of the tower 4, and that the external wind is circulated in the circumference direction inside the tunnel-like cover members 25. Accordingly, the cooling efficiency can be improved by increasing the number of installation locations of the exhaust vents 22 and increasing the openings areas of the exhaust vents 22 without losing the strength of the tower 4.

Fourth Embodiment

Figure 10:
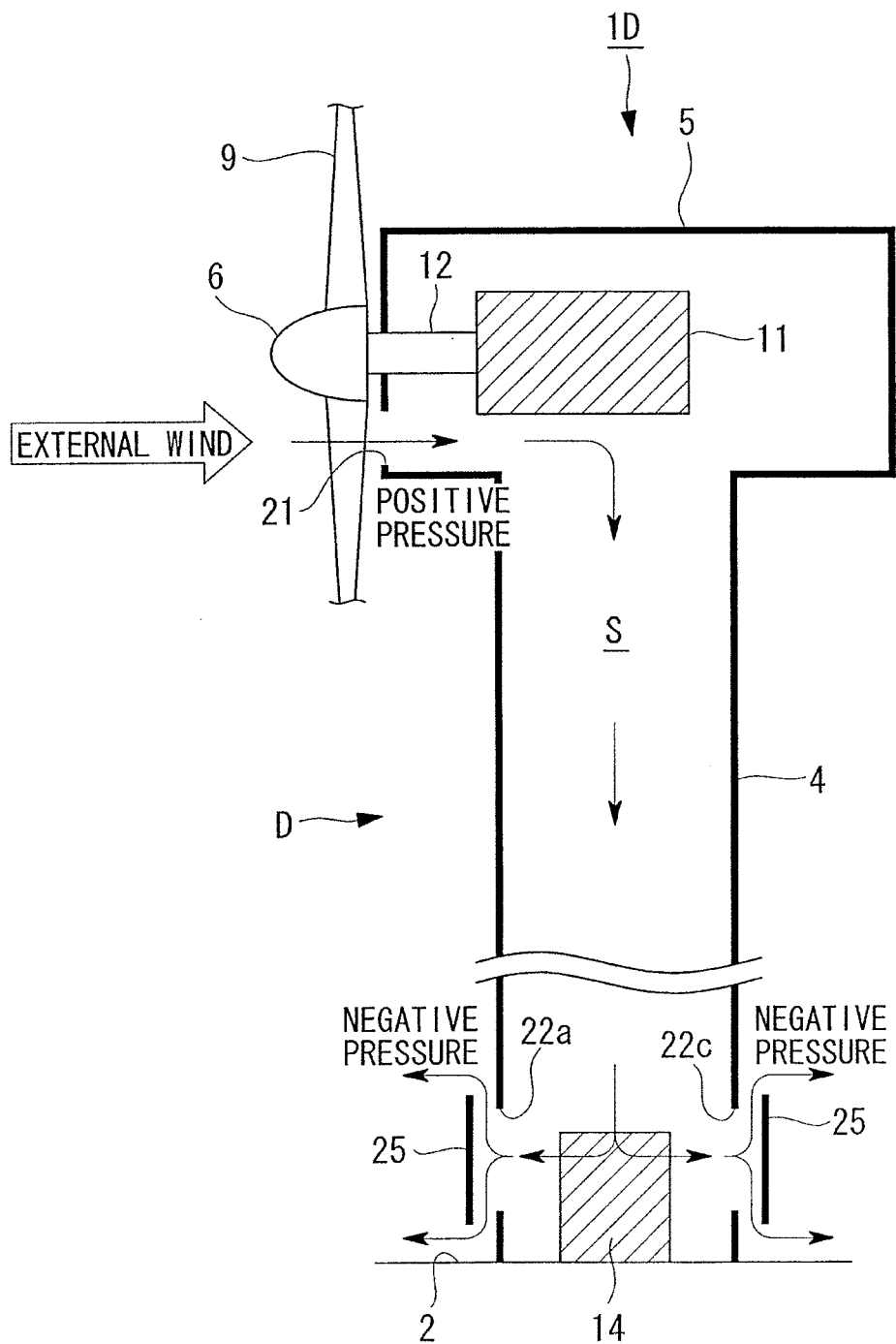
FIG. 10 is a schematic longitudinal cross-section of a wind turbine generator according to a fourth embodiment of the present invention.

FIG. 10 is a schematic longitudinal cross-section of a wind turbine generator 1D according to a fourth embodiment of the present invention. The wind turbine generator 1D is provided with a cooling structure D. This cooling structure D differs from the cooling structure C in the above-described third embodiment only in that the installation location of the introducing vent 21 is at a front surface of the nacelle 5 instead of the tower 4 and that the installation height of the four exhaust vents 22a to 22d is close to the bottom end of the tower 4, and other configurations are the same as those of the cooling structure C. The number of exhaust vents 22a to 22d does not necessarily need to be four locations.

In this cooling structure D, the introducing vent 21 opens at the front surface of the nacelle 5, for example, below a portion where the rotation shaft 12 of the turbine blades 9 protrudes; however, it may be provided at other locations, for example, at a side surface, top surface, etc. of the nacelle 5, so long as the structure thereof opens frontward (upwind). The positions of the exhaust vents 22a to 22d in the circumference direction provided at the outer circumference surface of the tower 4, the structure of the cover members 25, which serves as the negative-pressure enhancing means, the operations and effects thereof, etc. are similar to those in the cooling structure C.

With the thus-configured cooling structure D, the introducing vent 21 provided in the nacelle 5 always faces the upwind side according to the controlled turning of the nacelle 5; therefore, the maximum amount of external wind that is taken in from the introducing vent 21 is always ensured. On the other hand, at the exhaust vents 22a to 22d, as described above, an excellent exhaust performance can be obtained by providing the cover members 25; therefore, the pressure difference between the introducing vent 21 and the exhaust vents 22a to 22d can be increased further, the supply amount of the cooling air supplied to the internal space S in the wind turbine generator 1D can be increased, and a high cooling efficiency can be obtained with no motive force. Moreover, it is possible to reliably cool not only the electrical equipment 14 installed at the bottom portion of the tower 4 but also heat-generating machines installed in the nacelle 5, such as the generator 11, etc.

Fifth Embodiment

Figure 11:
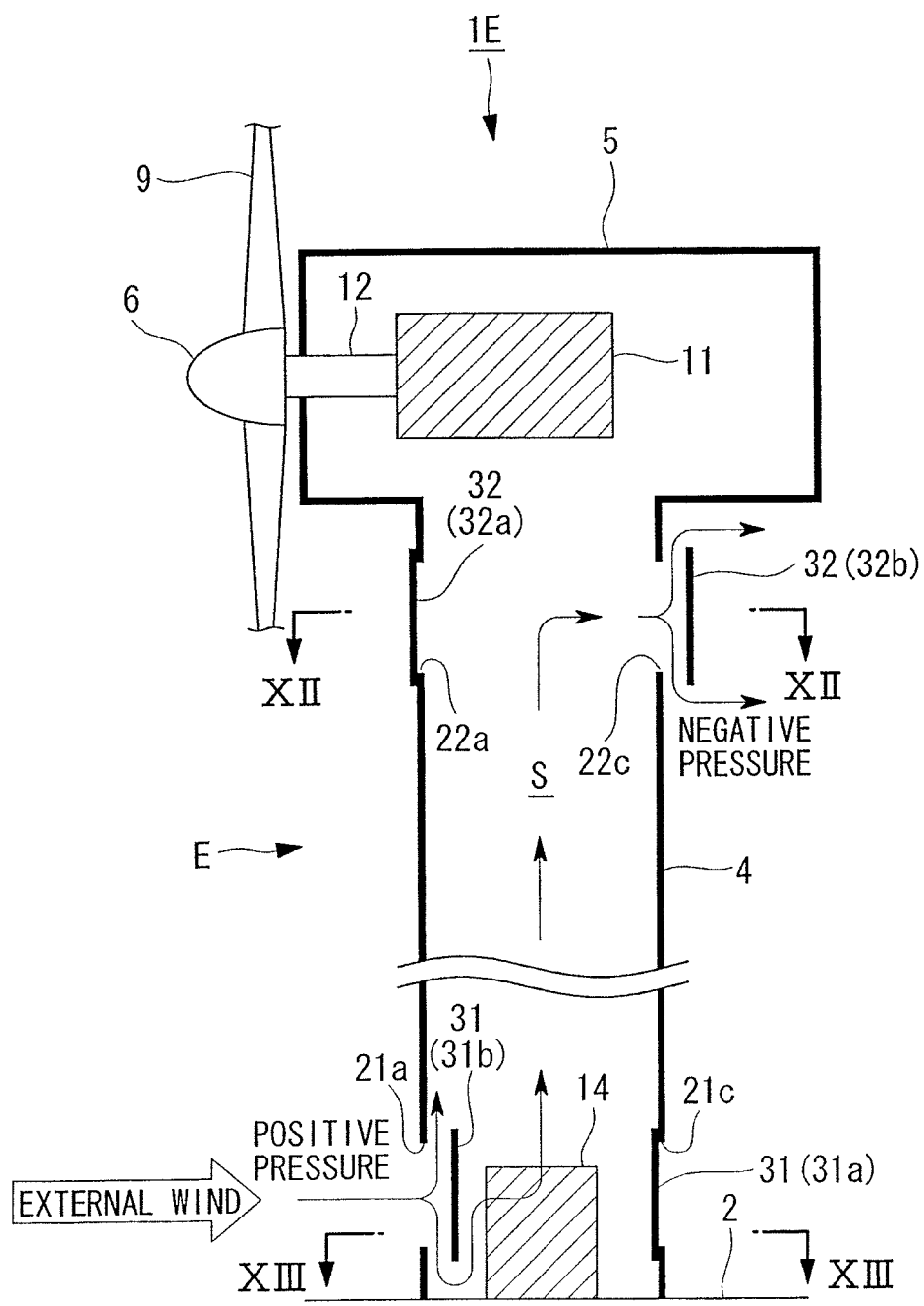
FIG. 11 is a schematic longitudinal cross-section of a wind turbine generator according to a fifth embodiment of the present invention.
Figure 12:
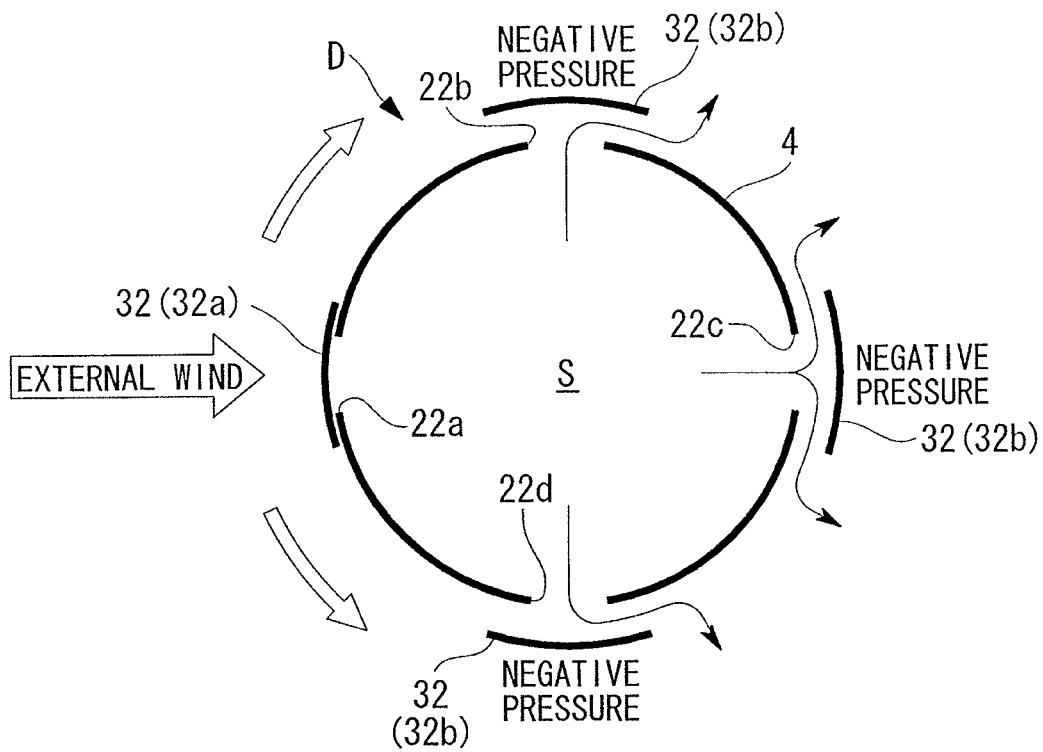
FIG. 12 is a lateral cross-section taken along line XII-XII in FIG. 11.
Figure 13:
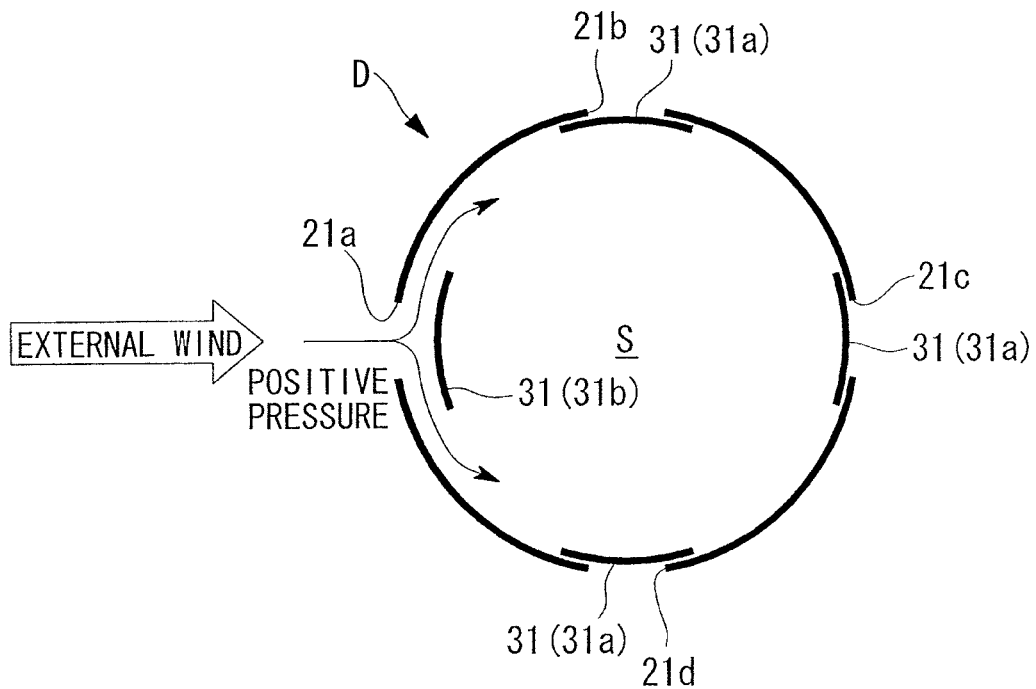
FIG. 13 is a lateral cross-section taken along line XIII-XIII in FIG. 11.

FIG. 11 is a schematic longitudinal cross-section of a wind turbine generator 1E according to a fifth embodiment of the present invention, FIG. 12 is a lateral cross-section taken along line XII-XII in FIG. 11, and FIG. 13 is a lateral cross-section taken along line XIII-XIII in FIG. 11. The wind turbine generator 1E is provided with a cooling structure E. In this cooling structure E, four introducing vents 21a to 21d are disposed close to the bottom end of the tower 4, for example, at 90° intervals in the circumference direction, and the four exhaust vents 22a to 22d are disposed close to the top end of the tower 4 similarly at 90° intervals in the circumference direction. An inner-lid member 31 is provided at each of the introducing vents 21a to 21d as introducing-vent opening/closing means, and an outer-lid member 32 is provided at each of the exhaust vents 22a to 22d as exhausting-vent opening/closing means. The number of introducing vents 21a to 21d and the exhaust vents 22a to 22d does not necessarily need to be four locations; for example, they may be provided at three locations at 120° intervals, and the number and intervals thereof may be arbitrarily set.

As shown in FIG. 13, the inner-lid members 31 are plate-like members that are curved along the inner circumference surface of the tower 4, that are formed so as to be able to block the introducing vents 21a to 21d from inside in an airtight manner, and that are provided so that they can be brought into contact with and moved away from the introducing vents 21a to 21d from inside thereof. As shown in FIG. 12, the outer-lid members 32 are plate-like members that are curved along the outer circumference surface of the tower 4, that are formed so as to be able to block the exhaust vents 22a to 22d from outside in an airtight manner, and that are provided so that they can be brought into contact with and moved away from the exhaust vents 22a to 22d from outside thereof.

Figure 14A:
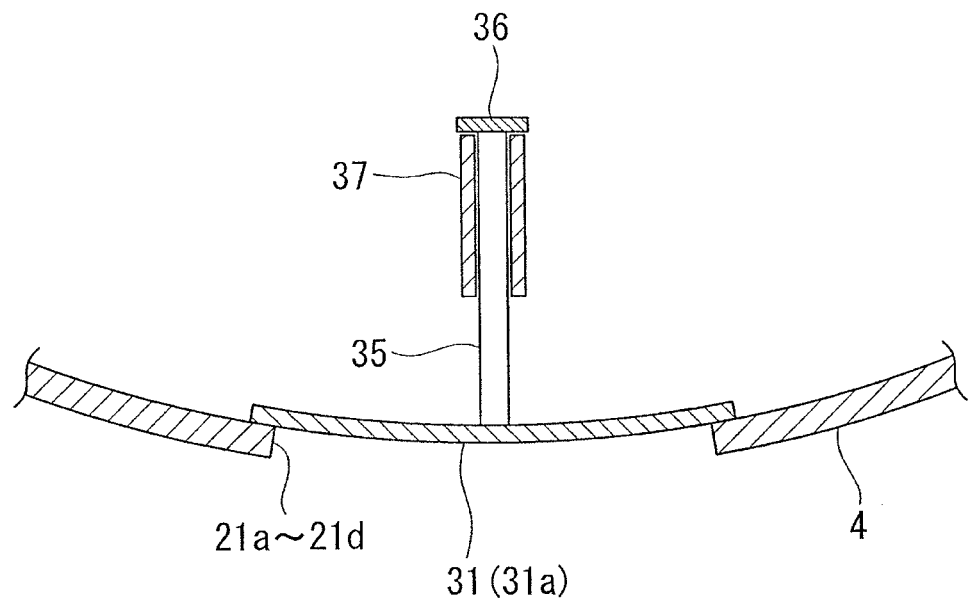
FIG. 14A is a lateral cross-section showing a first example structure of an introducing-vent opening/closing means, and a state in which an inner lid member is at a closed position is shown.
Figure 14B:
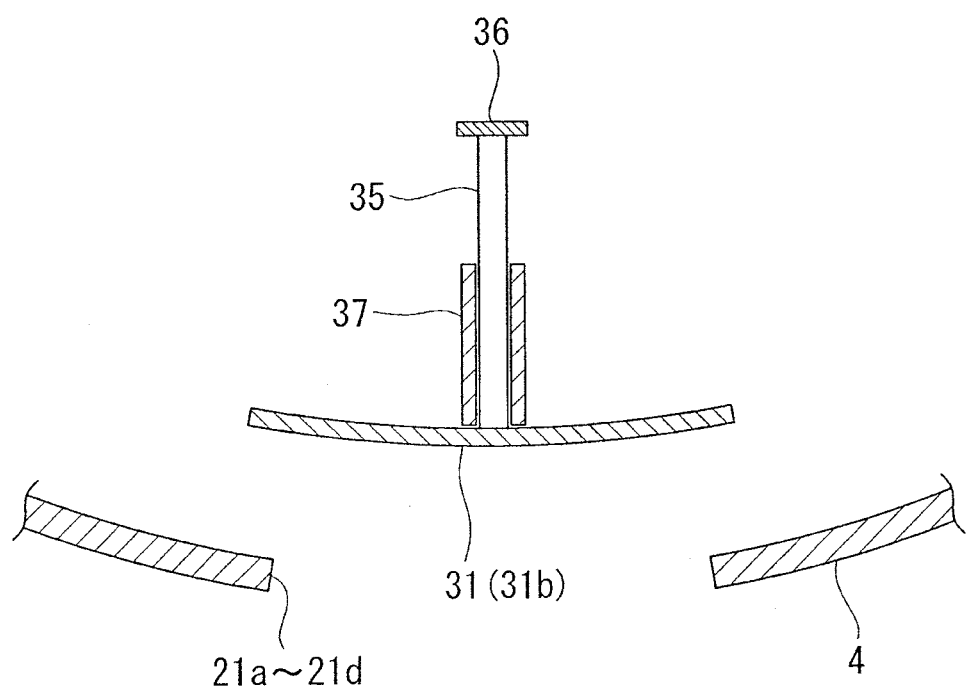
FIG. 14B is a lateral cross-section showing a first example structure of an introducing-vent opening/closing means, showing a state in which the inner lid member is at an open position.

In the inner-lid members 31, for example, as shown in FIGS. 14A and 14B, rod-like guide rods 35 are perpendicularly fixed at center portions thereof, and stopper plates 36 are bonded to the other ends of the guide rods 35. On the other hand, slide pipes 37 are fixed inside the introducing vents 21a to 21d with stay members (not shown), and the guide rods 35 are supported with the slide pipes 37 in a freely slidable manner in the shaft direction by being inserted thereinto. Accordingly, the inner-lid members 31 can be moved between a closed position 31a shown in FIG. 14A and an open position 31b shown in FIG. 14B. At the closed position 31a, the inner-lids 31 are in close contact with the introducing vents 21a to 21d from inside to block the introducing vents 21a to 21d, and the stopper plates 36 are in contact with inner ends of the slide pipes 37. At the open position 31b, the inner-lid members 31 are moved away inward from the introducing vents 21a to 21d to open the introducing vents 21a to 21d, and, at this time, the inner-lid members 31 are in contact with outer ends of the slide pipes 37, which restricts the movement thereof.

Figure 15A:
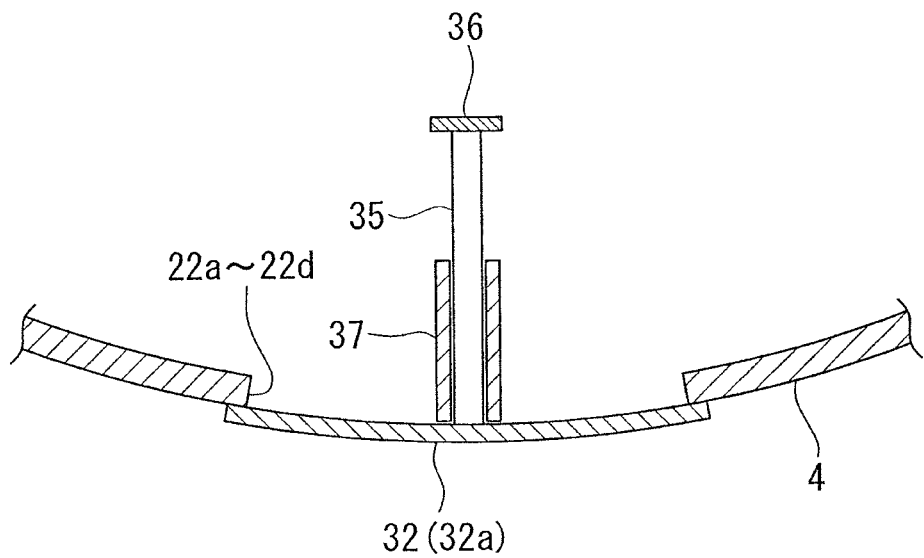
FIG. 15A is a lateral cross-section showing a first example structure of an exhaust-vent opening/closing means, showing a state in which an outer lid member is at a closed position.
Figure 15B:
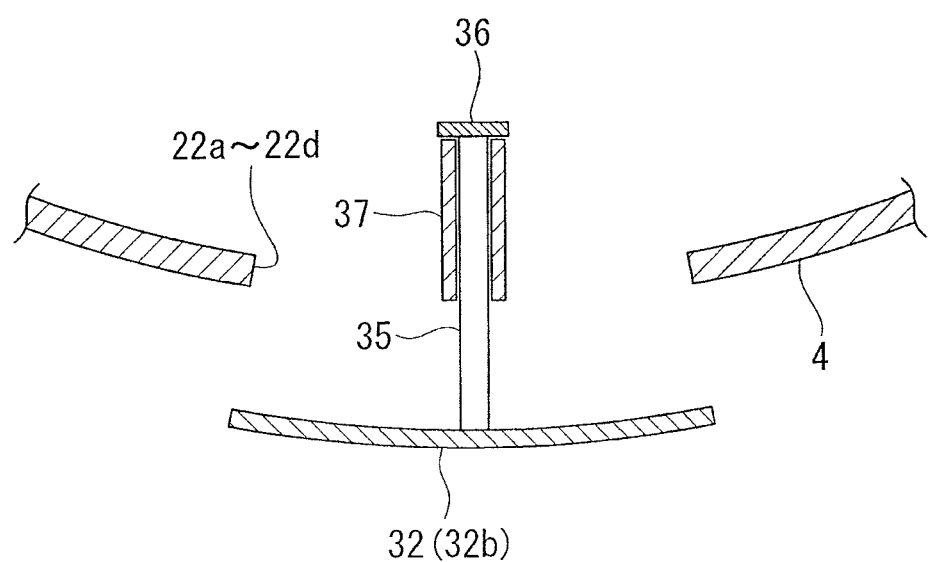
FIG. 15B is a lateral cross-section showing a first example structure of an exhaust-vent opening/closing means, showing a state in which an outer lid member is at an open position.

As shown in FIGS. 15A and 15B, in the outer-lid members 32, as in the inner-lid members 31, the guide rods 35 fixed to center portions thereof are supported in a freely slidable manner on the slide pipes 37 fixed to the inside of the exhaust vents 22a to 22d, and the stopper plates 36 are bonded to the other ends of the guide rods 35. Accordingly, the outer-lid members 32 can be moved between a closed position 32a shown in FIG. 15A and an open position 32b shown in FIG. 15B. At the closed position 32a, the outer-lid members 32 are in close contact with the exhaust vents 22a to 22d from outside and block the exhaust vents 22a to 22d. At the open position 32b, the outer-lid members 32 are moved away outward from the exhaust vents 22a to 22d to open the exhaust vents 22a to 22d, and, at this time, the stopper plates 36 are in contact with inner ends of the slide pipes 37, which restricts the movement of the outer-lid members 32.

The inner-lid members 31 slide from the closed position 31a to the open position 31b when the outside air pressure at the introducing vents 21a to 21d becomes greater than the inside air pressure and slide from the open position 31b to the closed position 31a when the inside air pressure at the introducing vents 21a to 21d becomes greater than the outside air pressure. The outer-lid members 32 slide from the open position 32b to the closed position 32a when the outside air pressure at the exhaust vents 22a to 22d becomes greater than the inside air pressure and slide from the closed position 32a to the open position 32b when the inside air pressure at the exhaust vents 22a to 22d becomes greater than the outside air pressure. For such sliding motion, the inner-lid members 31 and the outer-lid members 32 may be naturally moved by being pushed by air pressure; however, open/close control may be provided in accordance with the air pressure by employing a dedicated drive device and control device.

The cooling structure E configured as above operates as follows.

For example, when the external wind blows on the wind turbine generator 1E from the front side, of the four introducing vents 21a to 21d provided close to the bottom end of the tower 4, at the introducing vent 21a, which directly faces the external wind, the air pressure outside thereof becomes greater than the air pressure inside; therefore, the inner-lid members 31 are pressed by the air pressure and slide to the open position 31b, and the introducing vent 21a is opened. On the other hand, because the introducing vents 21b and 21d are located at positions 90° away from the introducing vent 21a in the circumference direction, the negative pressure acts at these positions due to the external wind that flows at the surfaces thereof. Furthermore, the negative pressure also acts outside the introducing vent 21c. Accordingly, the inside air pressure becomes greater than the outside air pressure at the introducing vents 21b, 21c and 21d, and each inner-lid member 31 slides to the closed position 31a to block the introducing vents 21b, 21c, and 21d. Therefore, the external wind flows into the internal space S in the tower 4 only from the introducing vent 21a that is directly facing the external wind.

On the other hand, of the four exhaust vents 22a to 22d provided near the top end of the tower 4, at the exhaust vent 22a that directly faces the external wind, the outside air pressure becomes greater than the inside air pressure; therefore, the outer-lid member 32 slides to the closed position 32a by being pressed by the air pressure and the exhaust vent 22a becomes blocked. Because the exhaust vents 22b and 22d are located at positions 90° away from the exhaust vent 22a in the circumference direction, the negative pressure acts at these positions due to the external wind that flows at the surfaces thereof. Accordingly, the inside air pressure becomes greater than the outside air pressure at the exhaust vents 22b, 22c, and 22d; each outer-lid member 32 slides to the open position 32b; and the exhaust vents 22b, 22c, and 22d become open. Therefore, the air inside the tower 4 is exhausted from the exhaust vents 22b, 22c, and 22d, except for the exhaust vent 22a that directly faces the external wind.

Because a large amount of external air can be circulated in the internal space S in the wind turbine generator 1E in this way, cooling thereof can efficiently be performed. Moreover, even if the wind direction of the external wind changes, of the introducing vents 21a to 21d and the exhaust vents 22a to 22d, a plurality of which are provided, only those at optimum positions relative to the wind direction are opened, the external wind is taken into the interior of the wind turbine generator 1E, and the internal air is exhausted outside; therefore, the risk of decreasing the cooling efficiency of the wind turbine generator 1E depending on the wind direction is low, and a stable cooling effect can be obtained throughout the year.

Figure 16A:
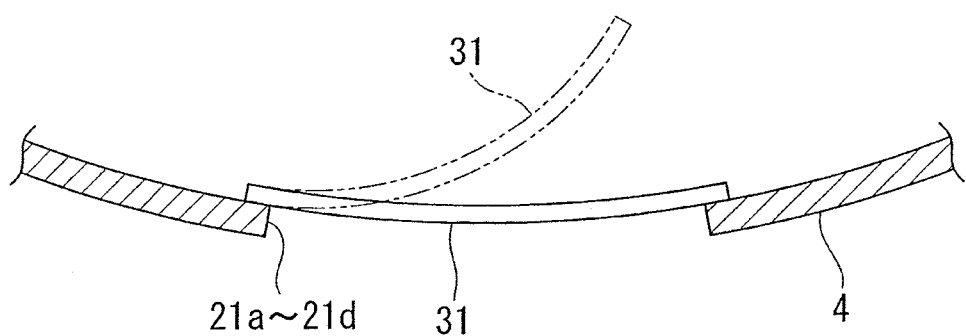
FIG. 16A is a lateral cross-section showing a second example structure of an introducing-vent opening/closing means.
Figure 16B:
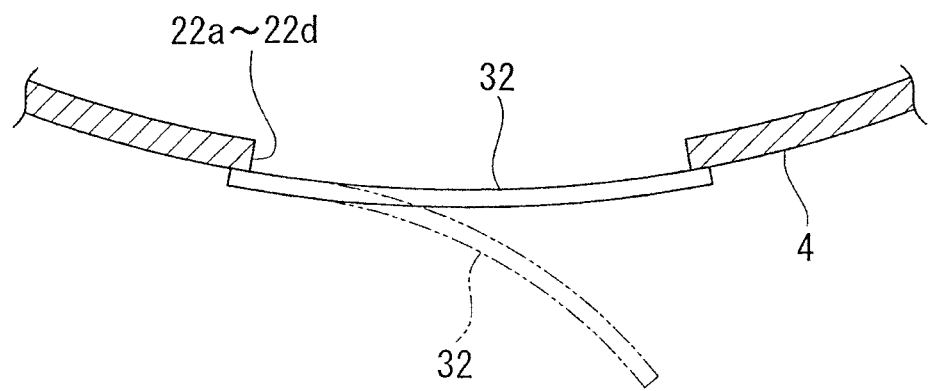
FIG. 16B is a lateral cross-section showing a second example structure of an exhaust-vent opening/closing means.

Because the inner-lid members 31 and the outer-lid members 32 have simple configurations, they do not lead to a considerable increase in costs. The inner-lid members 31 and the outer-lid members 32 are not limited to the above-described sliding types; other configurations may be employed. For example, as shown in FIGS. 16A and 16B, the inner-lid members 31 and the outer-lid members 32 can be more simply structured by configuring them as flapper types (reed-valve types).

Sixth Embodiment

Figure 17:
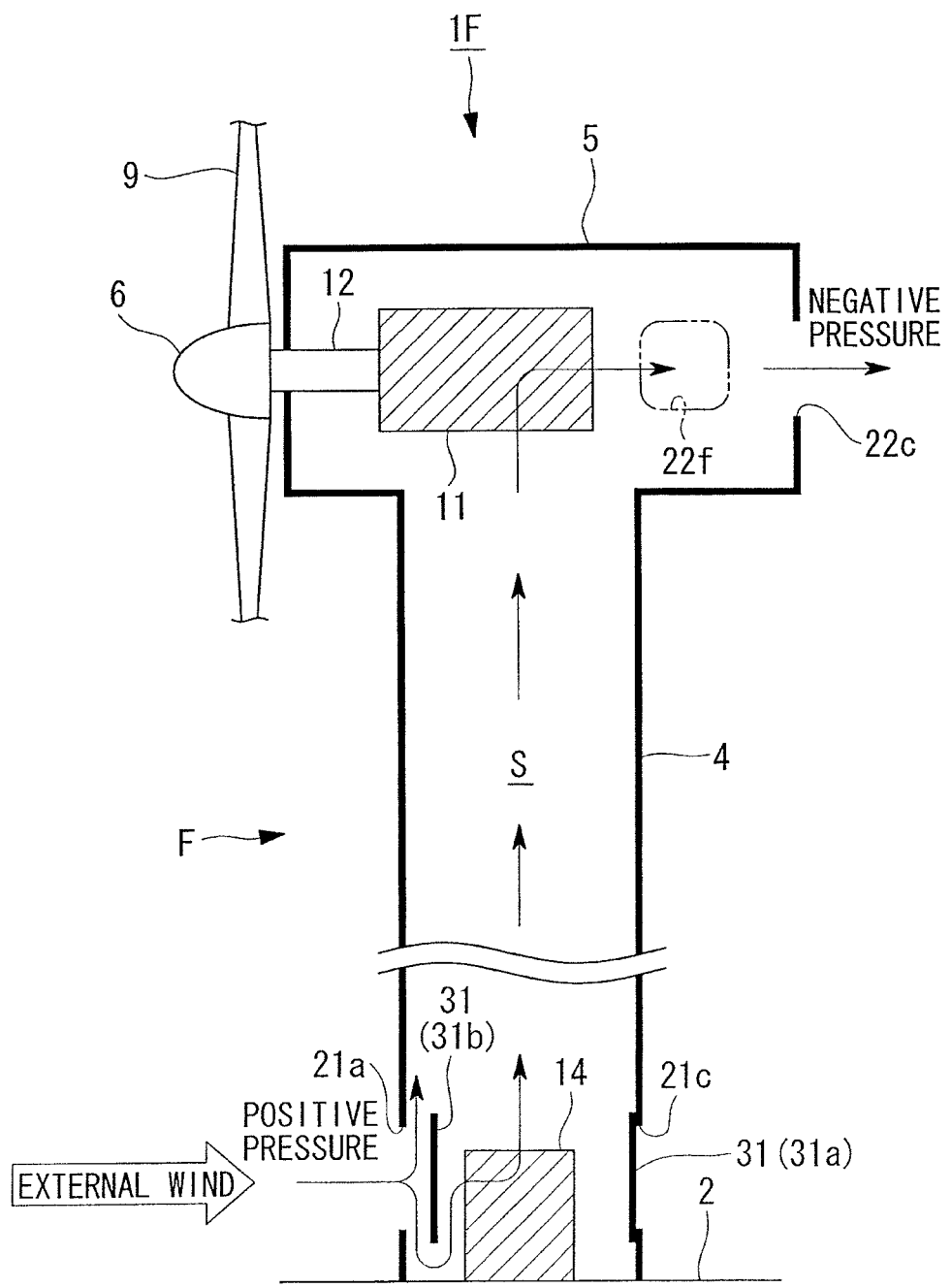
FIG. 17 is a schematic longitudinal cross-section of a wind turbine generator according to a sixth embodiment of the present invention.

FIG. 17 is a schematic longitudinal cross-section of a wind turbine generator 1F according to a sixth embodiment of the present invention. The wind turbine generator 1F is provided with a cooling structure F. This cooling structure F differs from the cooling structure E in the above-described fifth embodiment only in that the installation location of an exhaust vent 22e is at a rear surface of the nacelle 5 instead of the tower 4, and the configurations of other portions, including the introducing vents 21a to 21d, are the same as those of the cooling structure E. Note that, an exhaust vent 22f may be provided at a side surface of the nacelle 5 as shown by the two-dot-chain line.

In the case in which the exhaust vent 22e is provided at the rear surface of the nacelle 5, the exhaust vent 22e always faces the downwind side of the external wind in accordance with the turning of the nacelle 5, and in the case in which the exhaust vent 22f is provided at the side surface of the nacelle 5, the exhaust vent 22f is located at a position at which strong negative pressure is generated due to the eternal wind; therefore, in both cases, strong negative pressure acts outside of the exhaust vents 22e and 22f, and, consequently, an effect can be obtained whereby the air in the internal space S in the tower 4 is sucked outside from the exhaust vents 22e and 22f. Accordingly, the supply amount of the cooling air supplied from the introducing vents 21a to 21d to the internal space S in the wind turbine generator 1F can be increased, and the electrical equipment 14 installed at the bottom portion of the tower 4 and heat-generating machines installed in the nacelle 5, such as the generator 11, etc., can be effectively cooled.

Seventh Embodiment

Figure 18:
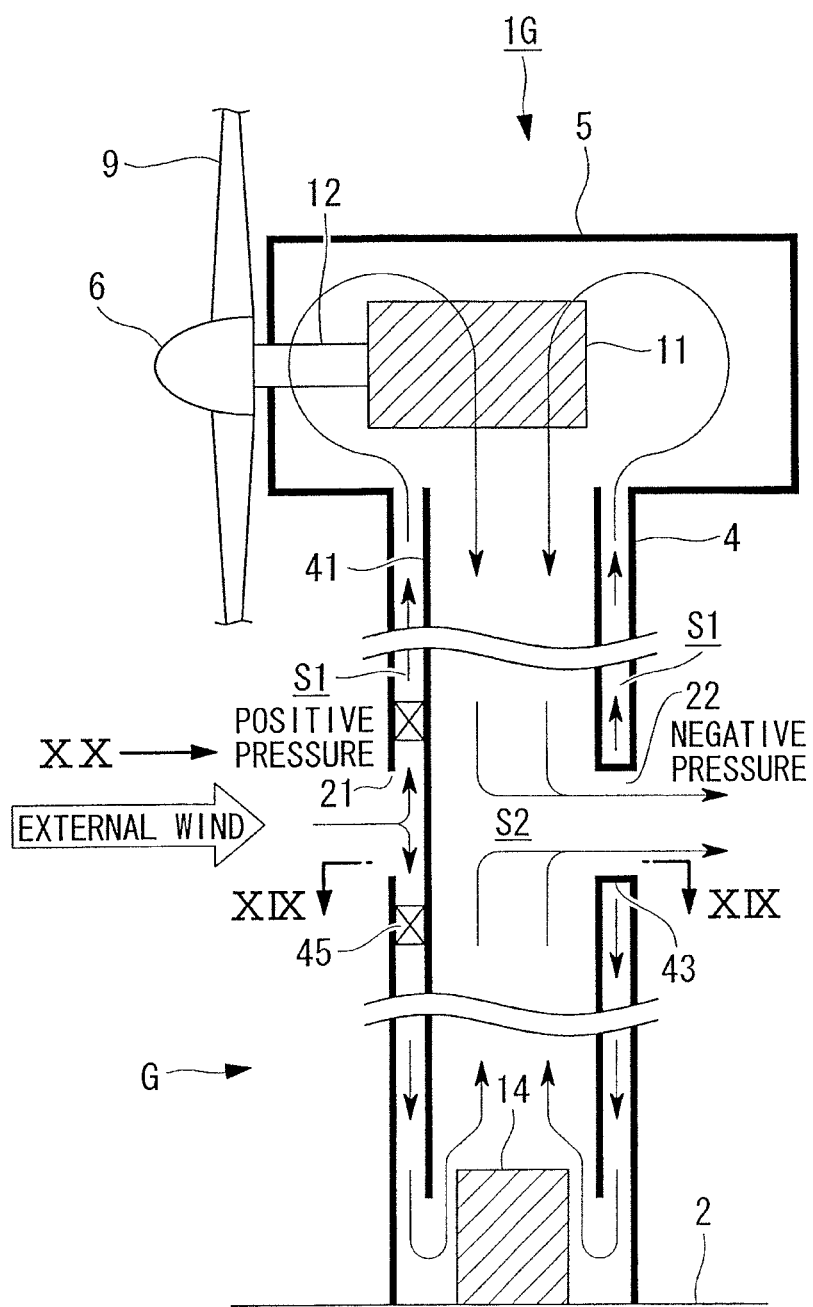
FIG. 18 is a schematic longitudinal cross-section of a wind turbine generator according to a seventh embodiment of the present invention.
Figure 19:
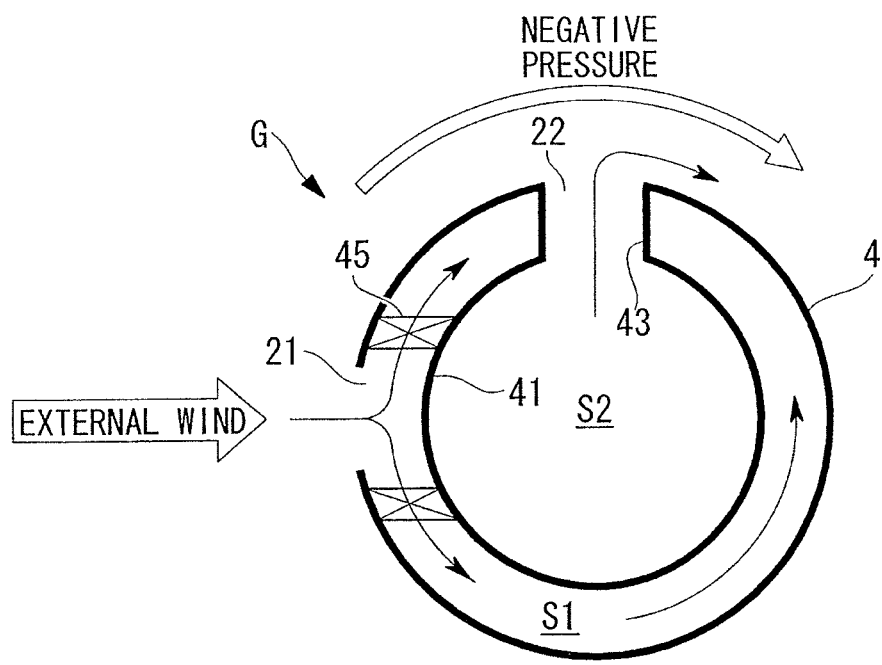
FIG. 19 is a lateral cross-section taken along line XIX-XIX in FIG. 18.

FIG. 18 is a schematic longitudinal cross-section of a wind turbine generator 1G according to a seventh embodiment of the present invention, FIG. 19 is a lateral cross-section taken along line XIX-XIX in FIG. 18. The wind turbine generator 1G is provided with a cooling structure G. In this cooling structure G, a cylindrical inner wall 41 is provided inside the tower 4, which makes the tower 4 a double-cylinder structure, an outer space S1 is formed at an outer circumference side of the interior of the tower 4, and an inner space S2 is formed at an inner circumference side of the outer space S1. Thus, for example, the introducing vent 21 is provided so as to communicate with the outer space S1, and the exhaust vent 22 is provided so as to communicate with the inner space S2. Although the heights for both the introducing vent 21 and the exhaust vent 22 are set close the middle portion of the tower 4, the height for each of them may be set differently.

FIG. 19 shows, in plan view, positions of the introducing vent 21 and the exhaust vent 22 in the circumference direction. The positions of the introducing vent 21 and the exhaust vent 22 in the circumference direction are, as in the cooling structure A in the first embodiment shown in FIG. 3, such that the introducing vent 21 is provided at, in the circumference direction of the outer circumference surface of the tower 4, the surface where the wind strikes the most on average throughout the year, that is, the surface subjected to the highest positive pressure due to the external wind, and the exhaust vent 22 is provided at the position that forms a right angle with the circumference direction from the introducing vent 21. The exhaust vents 22 may be provided at two locations on both sides of the introducing vent 21, etc.

The introducing vent 21 communicates with the outer space S1 by penetrating the outer wall of the tower 4 so that the external air introduced from the introducing vent 21 flows into the outer space S1. The exhaust vent 22 communicates with the inner space S2 via a communication pipe 43 so that the air in the inner space S2 is exhausted from the exhaust vent 22 without entering the outer space S1.

The height of the inner wall 41 at the top end thereof is substantially the same as the height of the part near the top end of the tower 4, and the outer space S1 and the inner space S2 are in communication at the interior of the nacelle 5. Because the height of the inner wall 41 at the bottom end thereof is positioned slightly higher than the height of the tower 4 at the bottom end thereof, the outer space S1 and the inner space S2 are in communication near the bottom end of the tower 4. In this way, the outer space S1 and the inner space S2 communicate with each other at positions away from the positions where the introducing vent 21 and the exhaust vent 22 are provided.

Figure 20:
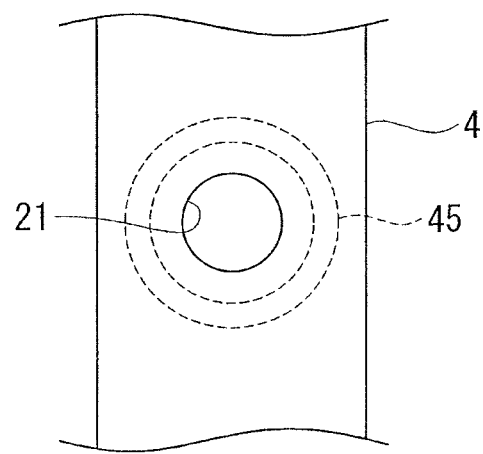
FIG. 20 is a view taken along the arrow XX in FIG. 18.

As also shown in FIG. 20, an arc-shaped filter member 45 is provided around the introducing vent 21. The filter member 45 is positioned downstream of the introducing vent 21 and functions as foreign-matter removing means that removes foreign matter contained in the external air introduced from the introducing vent 21, such as moisture, salt, dust, etc. By forming the arc-shaped filter member 45 that surrounds the introducing vent 21, all external air that is introduced from the introducing vent 21 and that flows in the outer space S1 in top-bottom and left-right directions can be filtered with the filter member 45. The shape of the filter member 45 is not limited to the arc shape. For example, a configuration may be employed in which the filter member 45 is formed by extending the cross-section thereof shown in FIG. 18 in the circumference direction of the outer space S1 without modification so that a large ring shape is formed in plan view and by flanking the introducing vent 21 with two, top and bottom, filter members.

The cooling structure G configured as above operates as follows.

When the external wind blows on the wind turbine generator G1, first, the external wind is introduced into the outer space S1 as cooling air from the introducing vent 21 provided at a portion at the outer circumference surface of the tower 4 where the positive pressure due to the external wind is received. This external wind flows in the outer space S1 in the top-bottom direction and the circumference direction after foreign matter therein, such as moisture, salt, dust, etc., has been removed when passing through the filter member 45. The air that has flowed upward in the outer space S1 temporarily flows into the nacelle 5, cools the heat-generating machines provided in the nacelle 5, such as the generator 11, etc., subsequently changes its flow direction to downward to enter the inner space S2, and flows downward to be exhausted outside from the exhaust vent 22.

On the other hand, the air that has flowed downward in the outer space S1 enters the inner space S2 from the bottom end of the inner wall 41, while changing its flow direction to upward, and flows upward to be exhausted outside from the exhaust vent 22 after cooling the heat-generating electrical equipment 14. Because the exhaust vent 22 is provided at the location where the negative pressure generated due to the external wind is maximized, a large pressure difference can be generated between the introducing vent 21 and the exhaust vent 22 and the air in the inner space S2 can be efficiently ventilated with no motive force.

With this configuration, foreign matter contained in the external wind, such as moisture, salt, dust, etc., can be made to naturally fall mainly in the outer space S1 to be separated from the air flow due to the fact that the distance from the introducing vent 21 to the exhaust vent 22 is increased, that the direction of the air flow changes between the outer space S1 and the inner space S2, and that a centrifugal force acts on the air flow that flows in the circumference direction in the outer space S1 which forms a cylindrical space; and, in combination with that fact that the filter member 45 is provided at the introducing vent 21, the foreign matter is reliably prevented from entering the inner space S2 and various internal equipment can be effectively protected.

Because it suffices to have a simple filter member 45 and it need not be provided in some cases, pressure loss due to the filter member 45 can be avoided or reduced, a sufficient amount of external wind can be taken in from the introducing vent 21, and the cooling efficiency inside the wind turbine generator 1G can be increased. Because the tower 4 is formed to have the double-cylinder structure by providing the inner wall 41 in the interior of the tower 4, the strength of the tower 4 can be increased.

Eighth Embodiment

Figure 21:
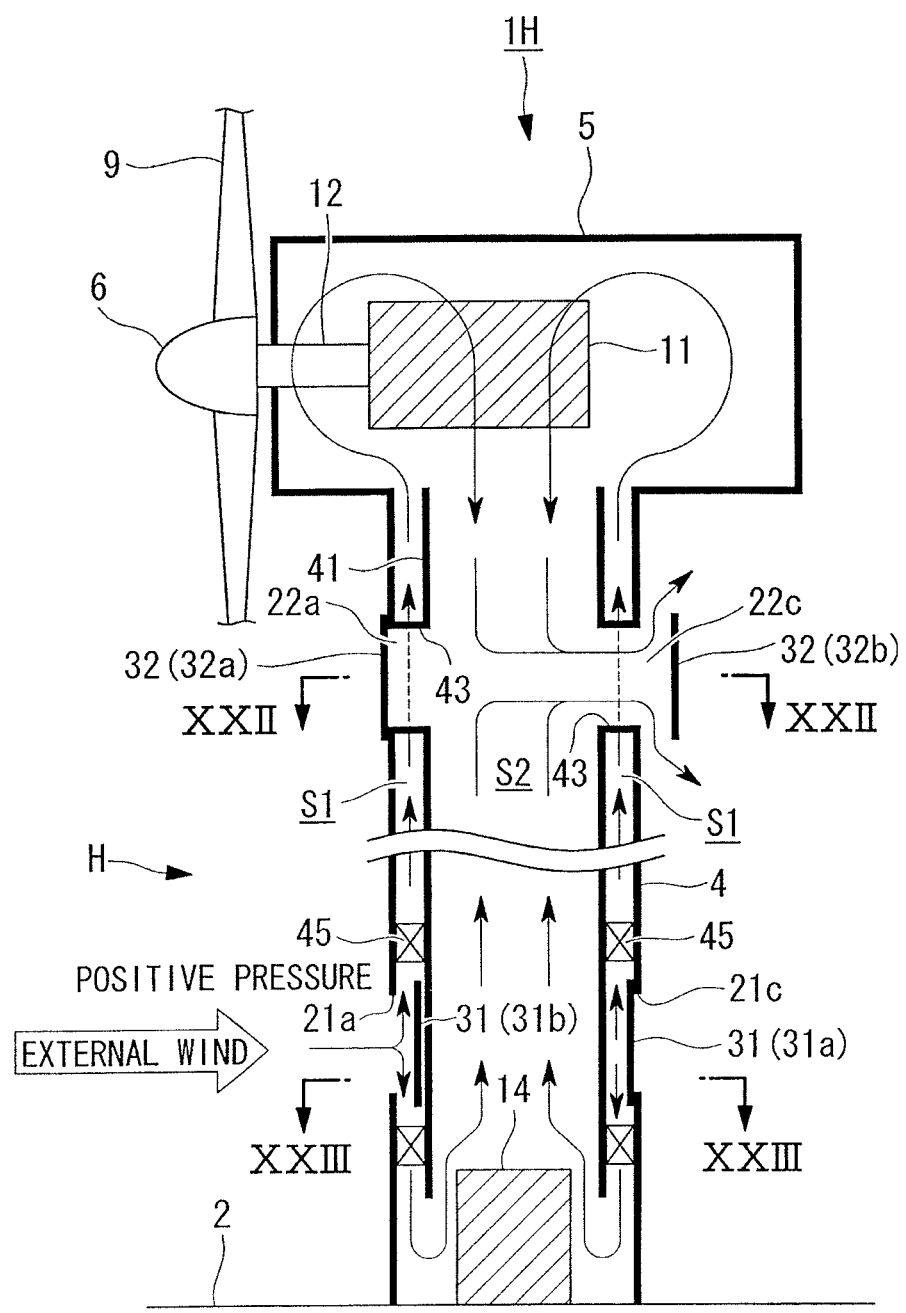
FIG. 21 is a schematic longitudinal cross-section of a wind turbine generator according to an eighth embodiment of the present invention.
Figure 22:
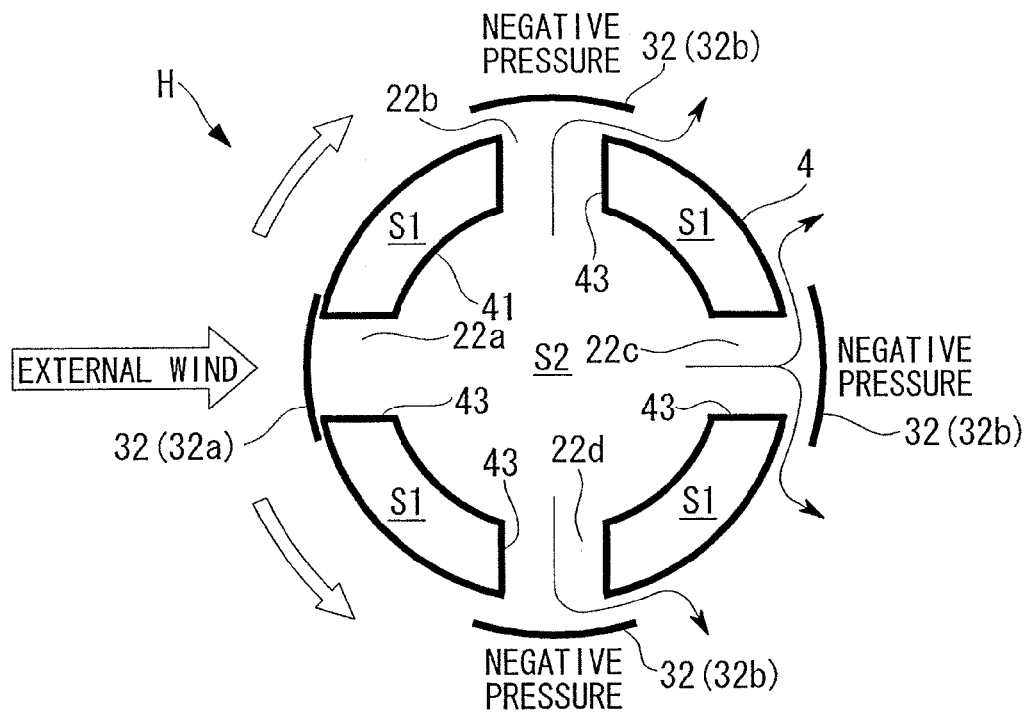
FIG. 22 is a lateral cross-section taken along line XXII-XXII in FIG. 21.
Figure 23:
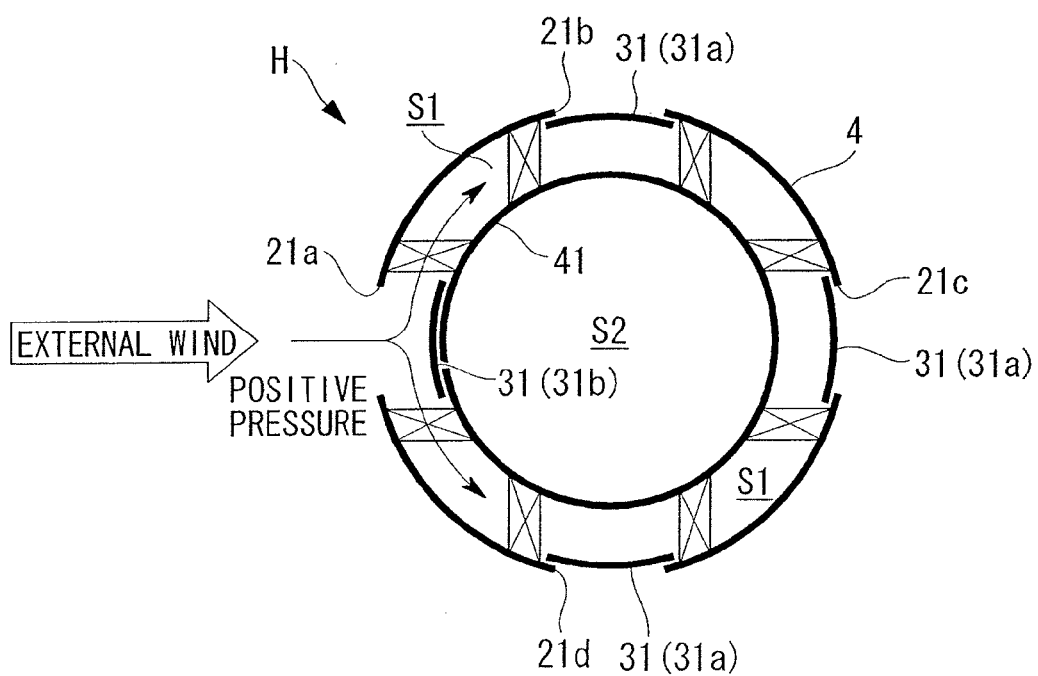
FIG. 23 is a lateral cross-section taken along line XXIII-XXIII in FIG. 21.

FIG. 21 is a schematic longitudinal cross-section of a wind turbine generator 1H according to an eighth embodiment of the present invention, FIG. 22 is a lateral cross-section taken along line XXII-XXII in FIG. 21, and FIG. 23 is a lateral cross-section taken along line XXIII-XXIII in FIG. 21. The wind turbine generator 1H is provided with a cooling structure H. In this cooling structure H, as in the above-described cooling structure G, the cylindrical inner wall 41 is provided inside the tower 4, which makes the tower 4 a double-cylinder structure, and the outer space S1 and the inner space S2 are formed inside the tower 4. In addition, for example, the four introducing vents 21a to 21d are disposed at 90° intervals in the circumference direction at a height that is slightly below the middle portion of the tower 4 and the four exhaust vents 22a to 22d are similarly disposed at 90° intervals in the circumference direction at a height that is slightly above the middle portion of the tower 4.

The introducing vents 21a to 21d communicate with the outer space S1 by penetrating the outer wall of the tower 4 so that the external air introduced from each of the introducing vents 21a to 21d flows into the outer space S1. The exhaust vents 22a to 22d communicate with the inner space S2 via the communication pipe 43 so that the air in the inner space S2 is exhausted from the exhaust vents 22a to 22d without entering the outer space S1. In addition, the inner-lid member 31 is provided at each of the introducing vents 21a to 21d as the introducing-vent opening/closing means, and the outer-lid member 32 is provided at each of the exhaust vents 22a to 22d as the exhausting-vent opening/closing means. The configuration and effects of the inner-lid members 31 and the outer-lid members 32 are the same as those of the cooling structure E according to the fifth embodiment. A filter member 45 similar to that in the cooling structure G according to the seventh embodiment is provided at each of the introducing vents 21a to 21d.

The cooling structure H configured as above operates as follows.

For example, when the external wind blows on the wind turbine generator 1H from the front side, as in the cooling structure E in the fifth embodiment, of the four introducing vents 21a to 21d provided at the outer circumference surface of the tower 4, the inner-lid member 31 is opened (in the open position 31b) only at the introducing vent 21a, which directly faces the external wind, and the inner-lid members 31 are closed (in the closed position 31a) at the other three introducing vents 21b, 21c, and 21d; therefore, the introducing vents 21b, 21c, and 21d are closed. Accordingly, the external wind flows into the outer space S1 only from the introducing vent 21a. The external wind that has flowed in flows in the outer space S1 in the top-bottom direction and the circumference direction after foreign matter therein, such as moisture, salt, dust, etc., are removed when passing through the filter member 45. The air that has flowed upward in the outer space S1 temporarily flows into the nacelle 5 and changes its flow direction to downward to flow in the inner space S2 after cooling the heat-generating machines installed in the nacelle 5, such as the generator 11, etc.

The air that has flowed downward in the outer space S1 enters the inner space S2 from the bottom end of the inner wall 41, while changing its flow direction to upward, and flows upward after cooling the heat-generating electrical equipment 14. Subsequently the air inside the inner space S2 is exhausted from the exhaust vents 22b, 22c, and 22d, because, as in the cooling structure E in the fifth embodiment, of the four exhaust vents 22a to 22d, the outer-lid member 32 is closed (put in the closed position 32a) only at the exhaust vent 22a, which directly faces with the external wind, and the outer-lid members 32 at the other three exhaust vents 22b, 22c, and 22d are opened (put in the open position 32b) due to the negative pressure caused by the external wind. In this way, the air in the inner space S2 can be efficiently ventilated with no motive force.

With this cooling structure H, as with the cooling structure G in the seventh embodiment, foreign matter contained in the external wind, such as moisture, salt, dust, etc., can be separated from the air flow by making them naturally fall mainly in the outer space S1, and various internal equipment can be protected. Moreover, as with the cooling structure E, the problem of the cooling efficiency of the wind turbine generator 1E being decreased depending on the wind direction is reduced, and a stable cooling effect can be obtained throughout the year.

Ninth Embodiment

Figure 24:
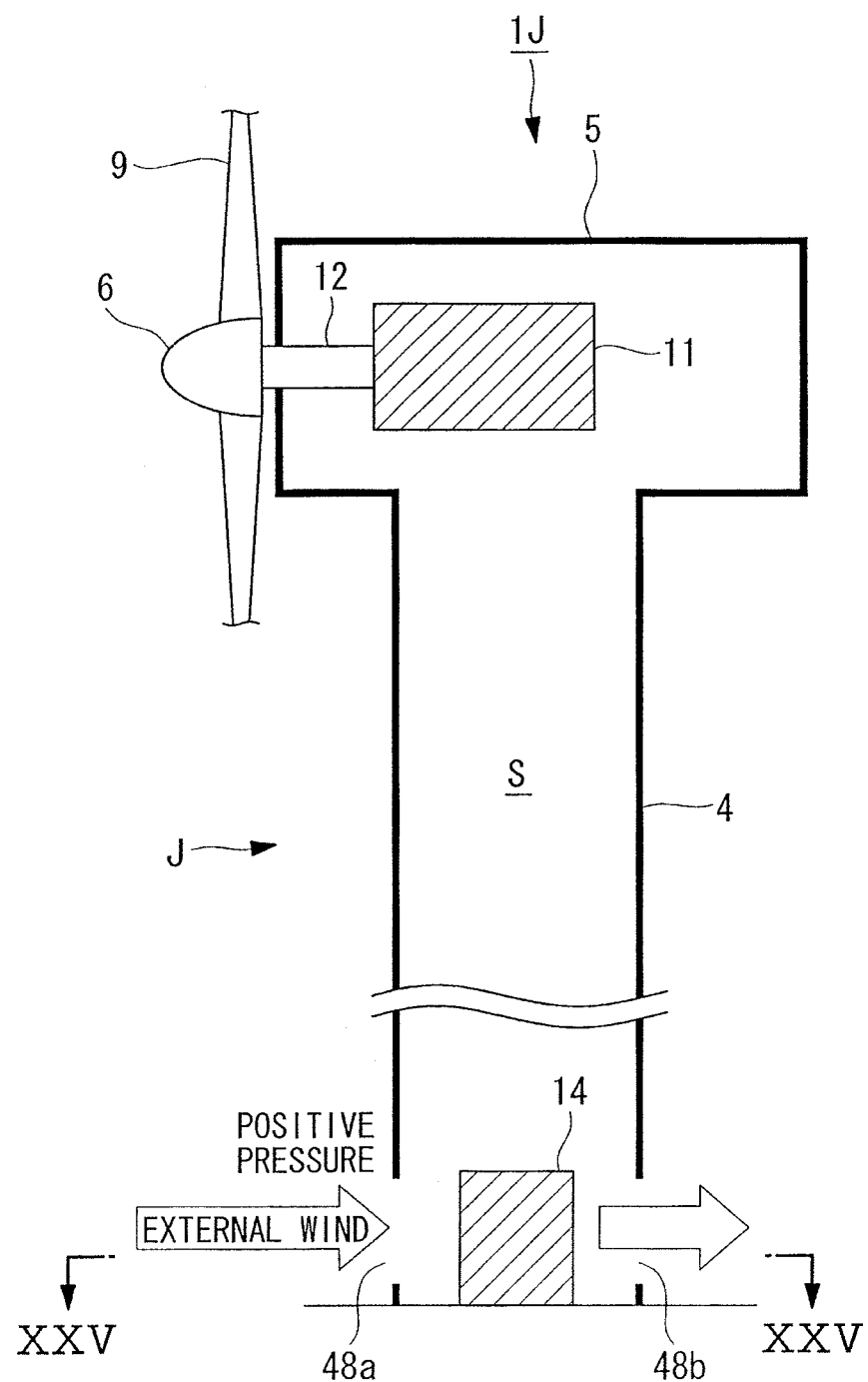
FIG. 24 is a schematic longitudinal cross-section of a wind turbine generator according to a ninth embodiment of the present invention.
Figure 25:
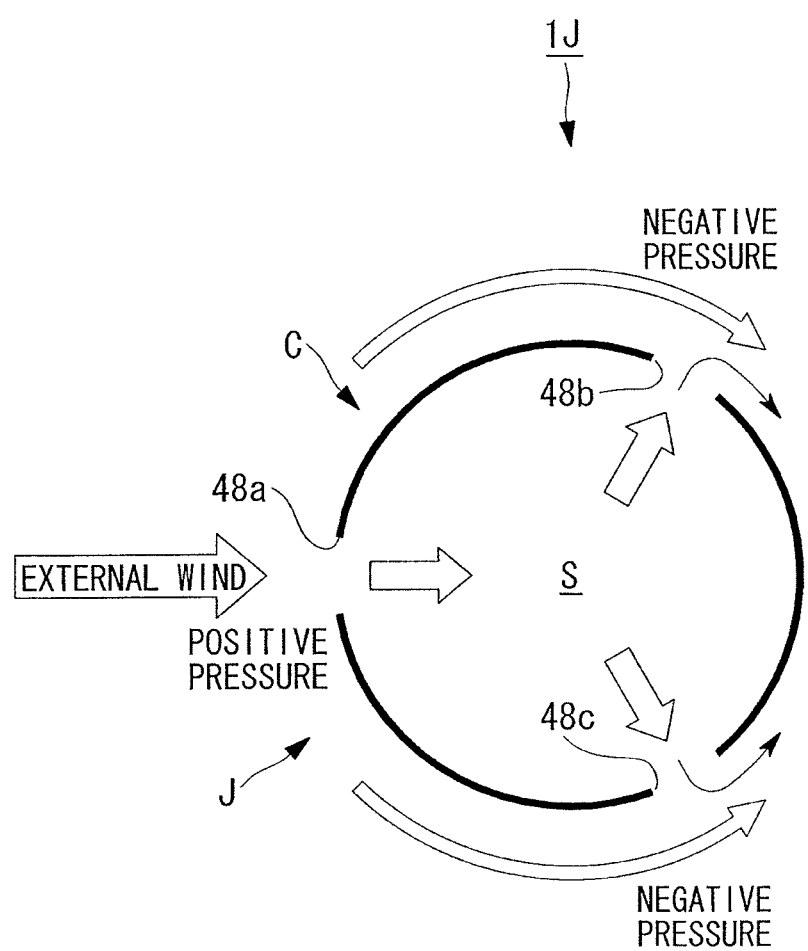
FIG. 25 is a lateral cross-section taken along line XXV-XXV in FIG. 24.

FIG. 24 is a schematic longitudinal cross-section of a wind turbine generator 1J according to a ninth embodiment of the present invention, FIG. 25 is a lateral cross-section taken along line XXV-XXV in FIG. 24. The wind turbine generator 1J is provided with a cooling structure J. In this cooling structure J, for example, air vents 48a to 48c are formed at three locations at 120° intervals along the circumference direction of the outer circumference surface of the tower 4, for example, near the bottom end of the tower 4. These air vents 48a to 48c serve as the introducing vent from which the external wind is taken into the internal space S in the tower 4 and serve as the exhaust vents from which the air in the internal space S is exhausted outside depending on the wind direction. These air vents 48a to 48c are provided so as to surround the periphery of the heat-generating equipment installed in the lower portion of the tower 4, such as the electrical equipment 14 etc.; however, they need not necessarily be provided at the same height, and height differences may be given to the individual air vents 48a to 48c. With regard to the positions in the circumference direction and the number of the individual air vents 48a to 48c, they do not necessarily have to be three locations at 120° intervals; for example, they may be provided at three or more locations.

The cooling structure J configured as above operates as follows.

For example, when the external wind blows on the wind turbine generator 1J, if the wind direction of the external wind is the wind direction that strikes the air vent 48a, as shown in FIG. 25, the air vent 48a serves as the introducing vent because it receives the positive pressure due to the external wind; and the external wind is directly introduced into the interior of the tower 4 from the air vent 48a as the cooling air and cools the electrical equipment 14. On the other hand, the air vents 48b and 48c serve as the exhaust vents because they receive the negative pressure due to the external wind, and the air in the internal space S is exhausted outside therefrom.

For example, if the external air changes to the wind direction that strikes the air vent 48b, in this case, the air vent 48b serves as the introducing vent, and the air vents 48a and 48c serve as the exhaust vents. If the external air changes to the wind direction that strikes the air vent 48c, the air vent 48c serves as the introducing vent, and the air vents 48a and 48b serve as the exhaust vents.

In this way, even if the wind direction of the external wind changes, one of the air vents 48a to 48c, a plurality of which are provided, serves as an introducing vent, and the others serve as exhaust vents; therefore, the electrical equipment 14 can always be satisfactorily cooled regardless of the wind direction.

The present invention is naturally not limited only to the forms of the first to ninth embodiments described above. For example, it is conceivable to add alterations such as appropriately combining the configurations in the first to ninth embodiments.

What is claimed is:

1. A wind turbine generator, in which a rotor head that rotates by receiving external wind with turbine blades generates power by driving a generator installed inside a nacelle and in which the nacelle is installed at a top end of a tower, wherein a plurality of introducing vents that takes the external wind into an internal space in the wind turbine generator is provided at a portion of an outer circumference surface of the tower or the nacelle that receives positive pressure due to the external wind, a plurality of exhaust vents that externally exhausts cooling air in the internal space is provided at a portion of the outer circumference surface of the tower or the nacelle that receives negative pressure due to the external wind, and wherein introducing-vent opening/closing means that opens when outside air pressure of the tower or the nacelle becomes greater than inside air pressure of the tower or the nacelle and that closes when the inside air pressure of the tower or the nacelle becomes greater than the outside air pressure of the tower or the nacelle is provided at each of the plurality of introducing vents of the tower or the nacelle.

2. A wind turbine generator according to claim 1, wherein exhausting-vent opening/closing means that closes when the outside air pressure of the tower or the nacelle becomes greater than the inside air pressure of the tower or the nacelle and that opens when the inside air pressure of the tower or the nacelle becomes greater than the outside air pressure of the tower or the nacelle is further provided at each of the plurality of exhaust vents of the tower or the nacelle.

3. A wind turbine generator according to claim 2, wherein the introducing-vent opening/closing means comprises
an inner lid disposed inside the tower or nacelle,
a guide rod extending from the inner lid to an inside of the tower or nacelle,
a stopper plate attached to an end of the guide rod on a side opposite to a side that the inner lid is attached, and
a slide pipe in which the guide rod slides for the introducing-vent opening/closing means to open and close.

4. A wind turbine generator according to claim 3, wherein the exhausting-vent opening/closing means comprises
an outer lid disposed outside the tower or nacelle,
a guide rod extending from the outer lid to an inside of the tower or nacelle,
a stopper plate attached to an end of the guide rod on a side opposite to a side that the outer lid is attached, and
a slide pipe in which the guide rod slides for the exhausting-vent opening/closing means to open and close.

5. A wind turbine generator according to claim 1, wherein, in a case where the plurality of introducing vents and the plurality of exhaust vents are provided in the tower, air vents are provided at three or more locations along the outer circumference surface in the circumference direction thereof; and these air vents serve as the introducing vents or the exhaust vents depending on wind direction.

* * * * *